United States Patent
Falkner et al.

(10) Patent No.: US 10,289,730 B2
(45) Date of Patent: May 14, 2019

(54) CROSS-SYSTEM DATA AGGREGATION

(71) Applicant: Microsoft Technology Licensing, LLC, Redmond, WA (US)

(72) Inventors: Michael F. Falkner, Fargo, ND (US); Annette M. Bruer, Fargo, ND (US); Shivendushital Pyarelal Pandey, Fargo, ND (US); Kevin M. Honeyman, Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 725 days.

(21) Appl. No.: 14/623,209

(22) Filed: Feb. 16, 2015

(65) Prior Publication Data

US 2016/0239565 A1    Aug. 18, 2016

(51) Int. Cl.
| | | |
|---|---|---|
| *G06F 17/00* | (2006.01) | |
| *G06F 17/30* | (2006.01) | |
| *G06F 3/0484* | (2013.01) | |
| *G06Q 10/06* | (2012.01) | |
| *G06Q 30/02* | (2012.01) | |

(52) U.S. Cl.
CPC ...... *G06F 17/30719* (2013.01); *G06F 3/0484* (2013.01); *G06F 17/30011* (2013.01); *G06F 17/30716* (2013.01); *G06Q 10/06* (2013.01); *G06Q 30/02* (2013.01); *Y04S 10/54* (2013.01)

(58) Field of Classification Search
None
See application file for complete search history.

(56) References Cited

U.S. PATENT DOCUMENTS

| | | |
|---|---|---|
| 6,101,493 A | 8/2000 | Marshall et al. |
| 6,289,361 B1 | 9/2001 | Uchida |
| 6,313,855 B1 * | 11/2001 | Shuping ............ G06F 3/0481 707/E17.111 |
| 7,657,541 B2 | 2/2010 | Meuer |
| 7,716,072 B1 | 5/2010 | Green et al. |
| 8,682,758 B2 | 3/2014 | Rainwater et al. |

(Continued)

FOREIGN PATENT DOCUMENTS

| | | |
|---|---|---|
| CN | 103279885 A | 9/2013 |
| WO | 2014089701 A1 | 6/2014 |

OTHER PUBLICATIONS

"Transaction Management System—Xerox Transactional Content Manager (XTCM)", Published on: Aug. 13, 2013, Available at: http://services.xerox.com/enterprise-content-management/content-management-solutions/transaction-management-system/enus.html 1 page.

(Continued)

*Primary Examiner* — Mustafa A Amin
(74) *Attorney, Agent, or Firm* — Christopher J. Volkmann; Kelly, Holt & Christenson, PLLC

(57) ABSTRACT

A first user interaction is detected indicating a user selection of a document. Relationship information on the document is accessed to identify related documents. Relationship information is accessed on the related documents to identify other related documents. This continues until all related documents are identified. The documents are displayed, on a single user interface display, in a aggregate view and each document is represented by a document display pane that shows summary information from the document.

19 Claims, 22 Drawing Sheets

(56) References Cited

U.S. PATENT DOCUMENTS

| | | | |
|---|---|---|---|
| 2004/0205514 A1* | 10/2004 | Sommerer | G06F 17/212 |
| | | | 715/205 |
| 2007/0136318 A1* | 6/2007 | Clark | G06F 17/30864 |
| 2012/0036125 A1* | 2/2012 | Al-Kofahi | G06F 17/30637 |
| | | | 707/728 |
| 2012/0210203 A1* | 8/2012 | Kandekar | G06F 17/30719 |
| | | | 715/230 |
| 2013/0080884 A1* | 3/2013 | Lisse | G06F 3/0483 |
| | | | 715/255 |
| 2013/0212455 A1 | 8/2013 | Titera et al. | |
| 2014/0006084 A1 | 1/2014 | Schmidt et al. | |
| 2014/0029743 A1 | 1/2014 | Blodgett et al. | |
| 2014/0245141 A1* | 8/2014 | Yeh | G06F 9/453 |
| | | | 715/708 |
| 2014/0281952 A1 | 9/2014 | Zhang | |
| 2015/0121181 A1* | 4/2015 | Joshi | G06F 17/211 |
| | | | 715/202 |

OTHER PUBLICATIONS

"General Ledger", Retrieved on: Dec. 10, 2014, Available at: http://www.greentree.com/general-ledger-software 9 pages.

"Zoho Books", Published on: Jul. 24, 2014, Available at: https://www.zoho.com/books/tour/invoicing/invoicing.html 6 pages.

* cited by examiner

CROSS-SYSTEM DATA AGGREGATION

BACKGROUND

Computing systems are currently in wide use. Some organizations use multiple different computing systems that operate on data, and that generate documents, in disparate ways.

For instance, an organization may use multiple different and disparate computing systems in order to conduct a variety of different activities. A first computing system may contain, for instance, a list of master records that identify various entities within the computing system. A second computing system may include documents that represent various types of activities (or transactions). There may be multiple, related documents that reflect an activity, and all or some of them may relate to underlying data in the disparate master record system.

Currently, in order to surface relevant content to a user, some such computer systems allow a user to select a document. The system then surfaces the document for interaction by the user. The document may contain links to other, related documents. However, in order to surface information on those documents, the user actuates the link and another form (or document) is displayed that corresponds to that link. If a user is attempting to research a relatively complicated issue, the user may need to view multiple related documents at the same time. With current systems, the user may need to open many different forms and attempt to view them on a display device.

The discussion above is merely provided for general background information and is not intended to be used as an aid in determining the scope of the claimed subject matter.

SUMMARY

A first user interaction is detected indicating a user selection of a document. Relationship information on the document is accessed to identify related documents. Relationship information is accessed on the related documents to identify other related documents. This continues until all related documents are identified. The documents are displayed, on a single user interface display, in an aggregate view and each document is represented by a document display pane that shows summary information from the document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
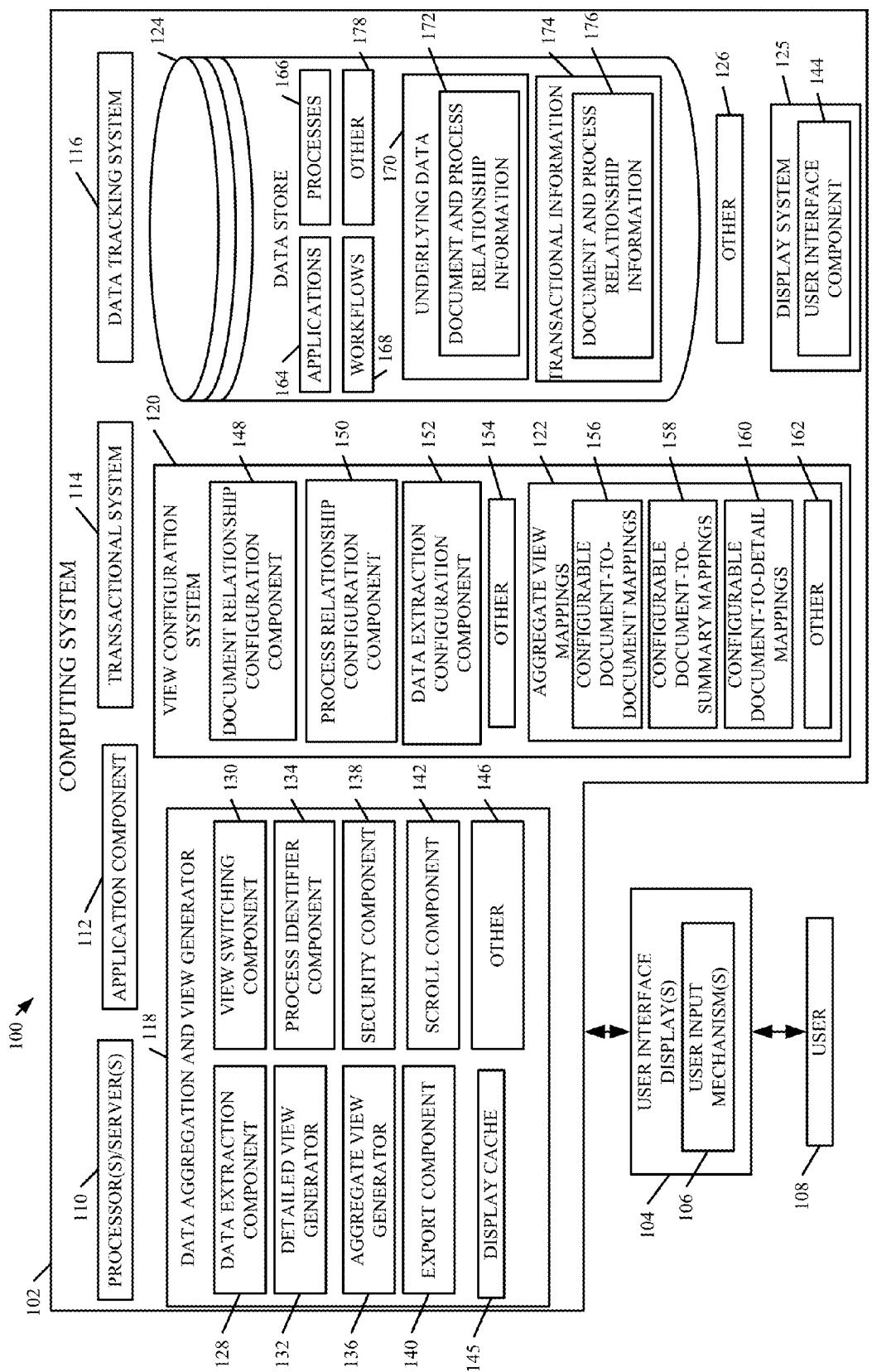
FIG. 1 is a block diagram of one example of a data aggregation architecture.

FIG. 1 is a block diagram of one example of a data aggregation architecture 100. Architecture 100 includes computing system 102 that illustratively generates user interface displays 104, with user input mechanisms 106, for interaction by user 108. User 108 illustratively interacts with user input mechanisms 106 in order to control and manipulate various applications or systems within computing system 102.

Computing system 102 illustratively includes one or more processors or servers 110, application component 112, transactional system 114, data tracking system 116, data aggregation and view generator 118, view configuration system 120, aggregate view mappings 122, data store 124, display system 125, and it can include other items 126. Data aggregation and view generator 118 illustratively includes data extraction component 128, view switching component 130, detailed view generator 132, process identifier component 134, aggregate view generator 136, security component 138, export component 140, scroll component 142, display cache 145 and it can include other items 146. Display system 125 illustratively includes user interface component 144. View configuration system 120 illustratively includes document relationship configuration component 148, process relationship configuration component 150, data extraction configuration component 152 and it can include other items 154. Aggregate view mappings illustratively include configurable document-to-document mappings 156, configurable document-to-summary mappings 158, configurable document-to-detail mappings 160, and it can include other items 162. Data store 124 illustratively includes applications 164, processes 166, workflows 168, underlying data 170 (that, itself, includes document and process relationship information 172), transaction information 174 (that, itself, includes document and process relationship information 176), and it can include other items 178.

Before describing the overall operation of architecture 100 in more detail, a brief description of some of the components in architecture 100, and their operation, will first be provided. Processors or servers 110 illustratively use application component 112 to run applications 164. The applications 164 can use processes 166, and workflows 168 and they can operate on a variety of data, such as transactional information 174 and underlying data 170. The applications can also be separate or disparate computing systems that are used by, for instance, transactional system 114 and data tracking system 116.

By way of example, transactional system 114 may be a system that generates documents (e.g., transactional information 174) that represent activities or transactions of an organization. Data tracking system 116 may be disparate from transactional system 114 (meaning that it is a separate application or separate set of applications or computing systems) that tracks separate information (such as underlying data 170). By way of example, data tracking system 116 may be a system that tracks master data for an organization. The master data, for instance, may include customer entities that identify and represent customers, vendor entities that identify and represent vendors, product entities that identify and represent products, proposal entities that identify and represent proposals, quote entities that identify and represent quotes, among a wide variety of other concepts within the computing system 102.

Thus, it can be seen that underlying data 170 is disparate from transactional information 174. That is, the data is generated and operated on by separate systems (e.g., data tracking system 116 and transactional system 114, respectively). While the data 170 may be related to information 174, it is still disparate because it is generated and operated on by a disparate system. As but one example, a transactional document in transactional information 174 may represent an invoice. The invoice may include customer information that resides in underlying data 170. However, the customer identifying information in underlying data 170 is generated and manipulated by data tracking system 116, while the invoice document is generated and manipulated by transactional system 114. Of course, these are only examples of different types of transactional information (or documents) 174 and disparate, but related underlying data 170.

Transactional information (or documents) 174 may be stored in tables within data store 124. The tables may include document and process relationship information 176. Information 176 for a given document illustratively identifies other documents that the given document is related to. For instance, if a document represents an invoice, then a related document may be a sales order document that represents a sales order.

Information 176 also illustratively identifies a particular process 166 or workflow 168 to which the given document belongs. For example, a sales order document may belong to a sales order process or workflow, while an invoice document may belong to an invoicing process or workflow.

Information 176 also illustratively identifies disparate data to which it is related. For instance, an invoice document may be related to a customer master record in data 170, or other data.

The underlying data 170 can also be stored in tables within data store 124. The tables can include document and process information 172. Underlying data 170 may also illustratively include document and process relationship information 172. Information 172 illustratively identifies the various documents (in transactional information 174) that are related to the underlying data. Information 172 may also identify various business processes that are related to the underlying data.

Data aggregation and view generator 118 illustratively detects a user interaction by user 108 selecting a particular document. It then identifies related documents, that are related to the selected document. Each document can have information that is to be displayed in an aggregate view. It will be noted that the information may come from the same system or from disparate systems. Therefore, the data displayed on the aggregate view may be disparate (cross-system) data, or data from the same system. In another example, the user can actuate an actuator to switch between displaying data from the same system and data from disparate systems. This is all described in greater detail below.

View configuration system 120 illustratively allows a user to configure the various information that is displayed on an aggregate view for any given selected document. For instance, document relationship configuration component 148 illustratively generates configuration user interface displays for user 108, with configuration user input mechanisms that can be actuated by user 108. When the user interacts with the user input mechanisms, the user can illustratively generate document-to-document mappings 156. Mappings 156 identify, for any given document or document type, the related documents that are to be used in generating the aggregate view for the selected document. For instance, it may be that an invoice document is related to a sales order document, a packing slip document, a receipts document, or other documents. However, it may be that when the user selects the invoice document, the user only wishes to have the aggregate view display information for the invoice document and the related packing slip document. Therefore, configuration component 148 allows the user to generate a mapping 156 that indicates that, for each invoice document selected, the aggregate view should only include information from the invoice document itself, and any related packing slip documents. Of course, this is an example only.

Process relationship configuration component 150 illustratively generates configuration displays for user 108, with user input mechanisms that can be actuated by user 108 in order to define a process that a given document is related to. In doing so, the user can illustratively modify the document and process relationship information 172 and 176 in the tables in data store 124.

Data extraction configuration component 152 illustratively generates configuration user interface displays with configuration user input mechanisms that can be actuated by user 108. When the user interacts with these user input mechanisms, the user can illustratively generate document-to-summary mappings 158. These mappings identify the particular information that is to be surfaced on an aggregate view, for a selected document and related documents. Therefore, for instance, when the user selects an invoice document, mappings 158 identify the particular information from that underlying invoice, and the related documents identified by mappings 156, that is to be surfaced on the aggregate view.

In another example, once the aggregate view is displayed, the user can interact with the aggregate view to see more detailed information. Thus, component 152 also illustratively generates user interface displays with user input mechanisms that user 108 can interact with in order to define the more detailed information that is to be surfaced on the aggregate view, in response to detected user inputs requesting such information. In doing so, the user illustratively generates document-to-detail mappings 160. This is also described in greater detail below.

When a user selects a given document, aggregate view generator 136 accesses the relationship information 176 in the selected document and mappings 156 to identify the set of related documents that are to be surfaced in the aggregate view for the selected document. In doing so, it illustratively traverses the chain of related documents identified in relationship information 176 to identify a superset of all documents that are related to the selected documents, or any intervening documents.

For instance, the user may select an invoice document. The selected invoice document may have information 176 indicating that it is related to a packing slip document. The packing slip document, itself, may include information 176 indicating that it is related to a receipts document. The receipts document may include additional information 176 indicating that it is related to still other documents. Thus, when an initial document (sometimes referred to herein as the "driving document") is selected by a user, aggregate view generator 136 follows the chain of related document information to identify a superset of related documents that are related to the driving document (or selected document)

either directly, or indirectly through the chain of related document information 176. It then accesses mappings 156 to identify a set of documents, within that superset of documents, that a user wishes to be surfaced in the aggregate view. Once the set of documents to be displayed is identified, data extraction component 128 accesses mappings 158 to identify the particular information from each of those documents that is to be surfaced on the aggregate view, and extracts that data. Security component 138 then enforces any desired security permissions so that user 108 is not presented with any information that he or she does not have permission to see. Process identifier component 134 identifies the process 166 or workflow 168 that the driving document belongs to, and generator 118 then controls display system 125 so user interface component 144 generates the aggregate view based on all of this information.

In one example, the user can interact with the aggregate view to view multiple different levels of detailed information, without ever leaving the aggregate view. When the user does that, detailed view generator 132 illustratively accesses document-to-detail mappings 160 to identify the particular detailed information that is to be surfaced in response to the user interaction. Data extraction component 128 extracts that detailed information and generator 118 controls display system 125 so user interface component 144 displays it on the aggregate view. Again, security component 138 enforces any security permissions with respect to the detailed information.

In another example, generator 136 can generate an actuator that allows the user to switch between viewing transactional information 174 for the driving document to viewing underlying data 170 corresponding to the driving document, or to view a combination of those two types of information. When the user actuates that actuator, view switching component 130 identifies the related underlying data 170 and data extraction component 128 extracts that information for presentation on the aggregated view.

In one example, data extraction component 128 can store all (or desired portions) of extracted information in display cache 145 so it can be quickly retrieved and re-used to reduce round trips to data store 124. In another example, information can be pre-fetched and stored in display cache 145. For instance, once the documents to be displayed have the aggregate view generated therefore, or while it is being generated, component 128 can pre-fetch detailed information or underlying data or other information that the user is likely to view, and store it in the cache 145. Retrieving all related documents and caching information further reduces network traffic.

In one example, the aggregate view has separate display panes corresponding to each of the related documents. The panes can be arranged in a pannable (e.g., horizontally scrollable) arrangement on a user interface display device. Thus, the user can provide scroll inputs. In response, scroll component 142 scrolls the display horizontally. Also, in one example, each pane can be displayed in a vertically scrollable configuration. Thus, in response to user scrolling interactions, scroll component 142 can scroll one or multiple panes vertically as well.

Figure 2A:
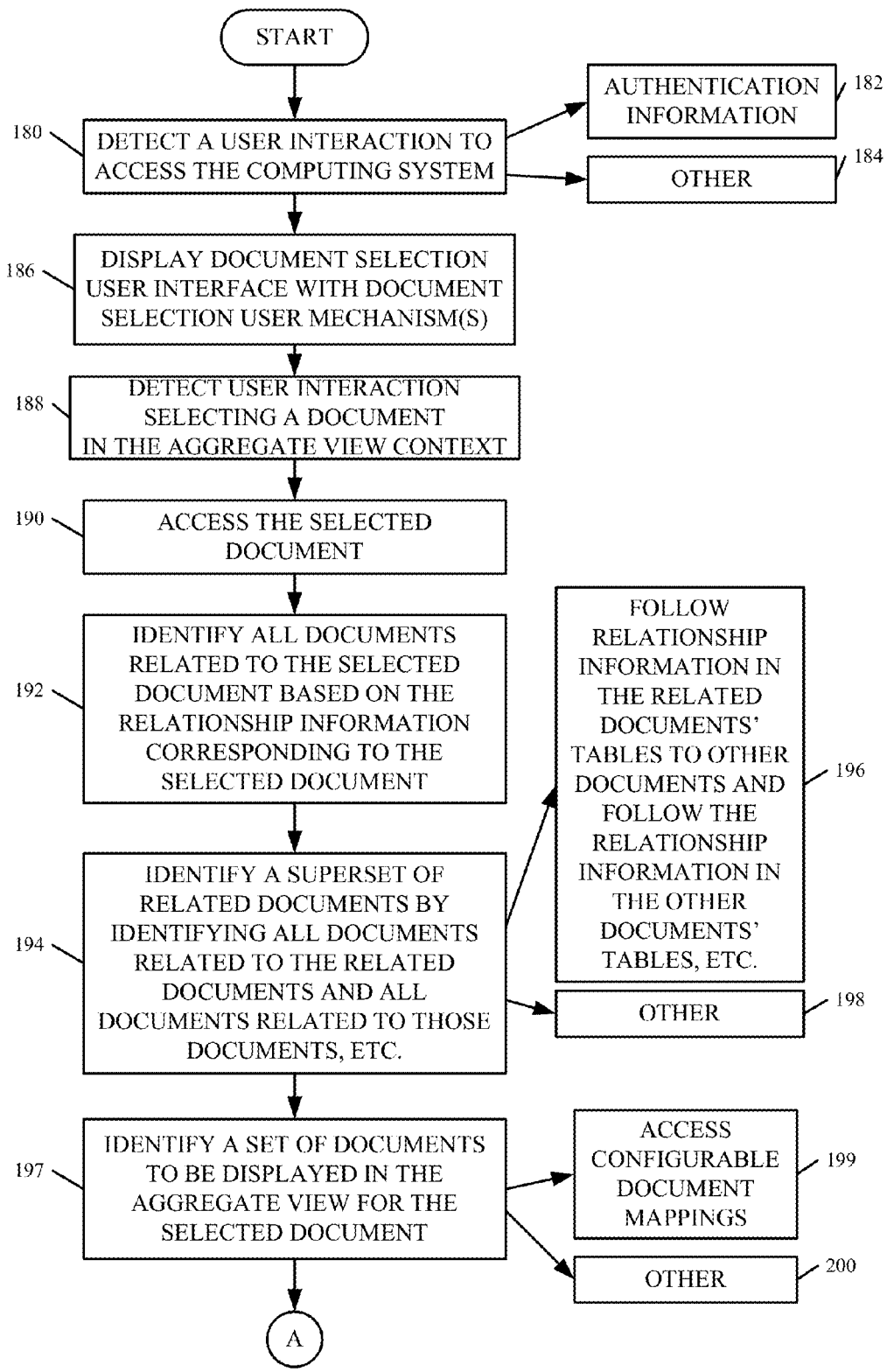
FIGS. 2A-2C (collectively referred to herein as FIG. 2) show a flow diagram illustrating one example of the operation of the architecture shown in FIG. 1, in generating an aggregate data display and in processing detected user interactions.
Figure 2B:
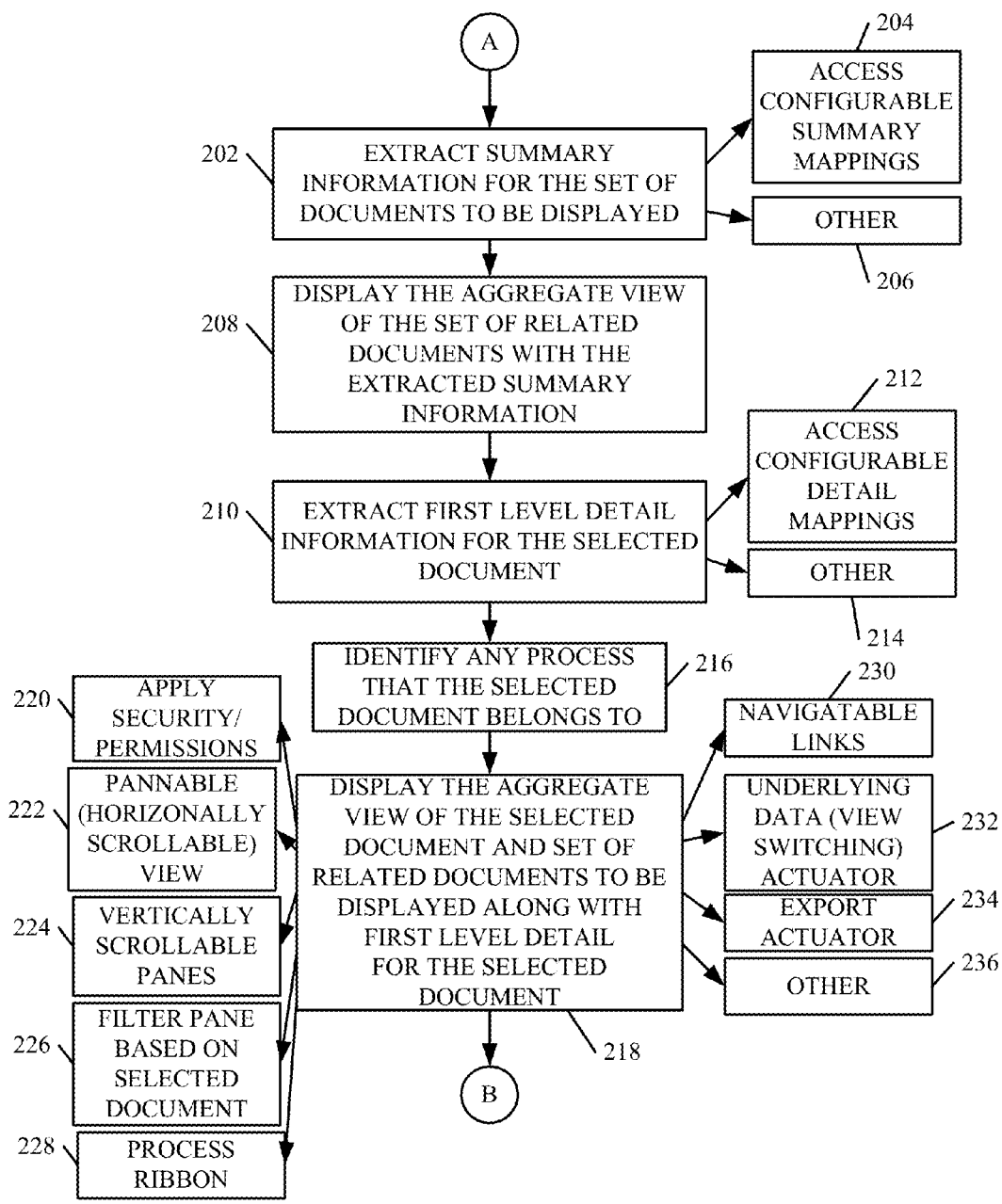
Figure 2C:
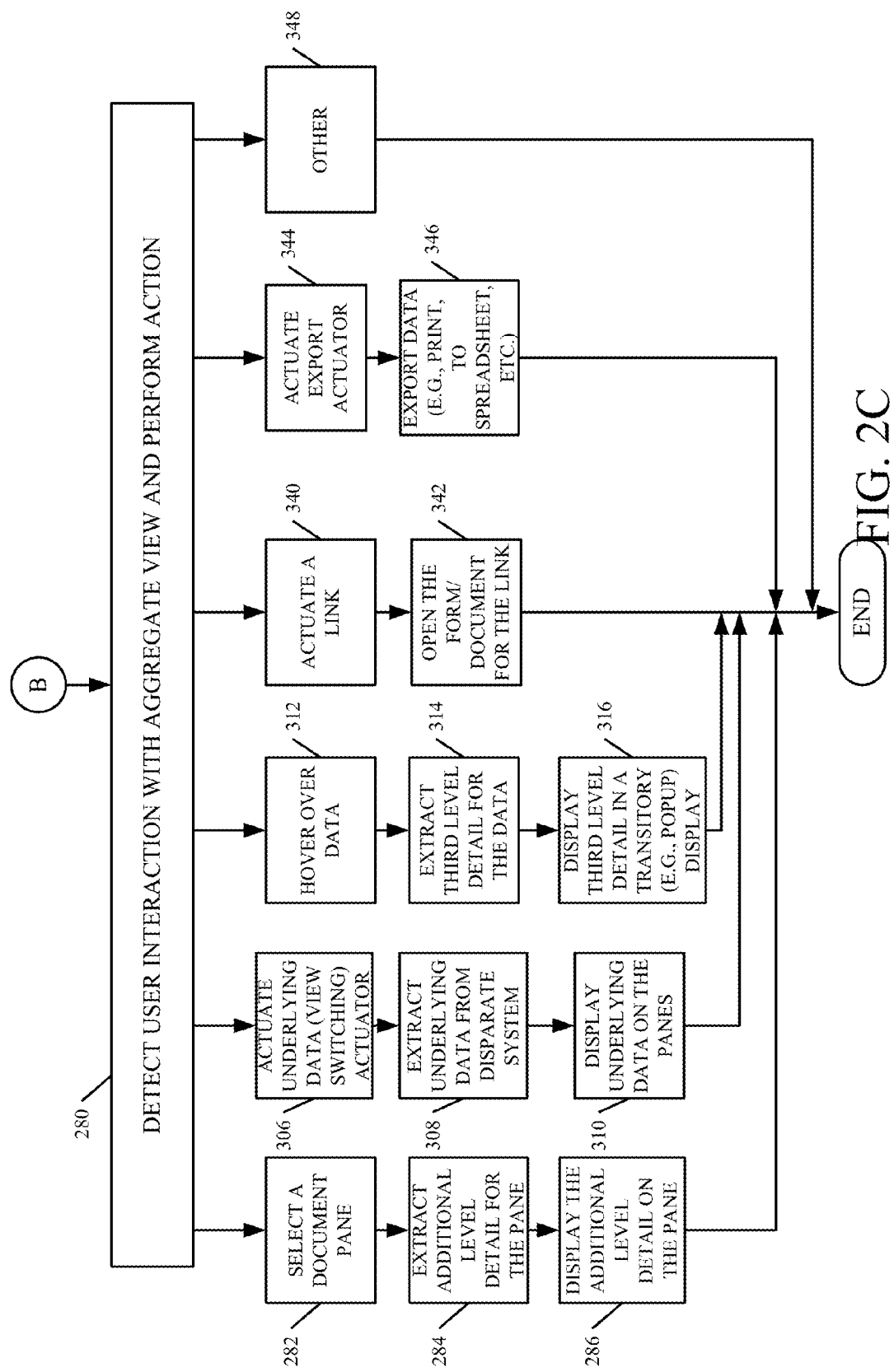

FIGS. 2A-2C (collectively referred to herein as FIG. 2) show a flow diagram illustrating one example of the operation of architecture 100 in more detail. FIGS. 3A-3L shows various examples of user interface displays. FIGS. 2-3L will now be described in conjunction with one another. Computing system 102 first detects a user interaction that indicates that the user wishes to access the computing system 102. This is indicated by block 180 in FIG. 2. By way of example, user 108 can provide authentication information 182 or other information 184, and provide other inputs to launch various systems within computing system 102.

In response, and at some point during the processing, display system 125 in computing system 102 will display a document selection user interface with document selection user input mechanisms. This is indicated by block 186. The user input mechanisms can detect user interactions that indicate that the user is selecting a given document from transaction information 174 (e.g., a driving document). Detecting user interaction selecting a document is indicated by block 188. Data aggregation and view generator 118 also identifies that user 108 is selecting the document to be viewed in the context of an aggregate view.

In response, aggregate view generator 136 accesses the selected document in data store 124. This is indicated by block 190.

Aggregate view generator 136 then follows the chain of related documents starting with the relationship information 176 in the selected document 174 and continuing through the chain of all related documents to identify the superset of all documents that are related through that chain to the selected document. Accessing the relationship information 176 is indicated by block 192 and identifying the superset of related documents is indicated by block 194. Following the relationship information in the related documents to other documents and following the relationship information in those documents etc., is indicated by block 196. Of course, the superset of related documents can be identified in other ways as well, and this is indicated by block 198.

From the superset of related documents, aggregate view generator 136 identifies a set of documents to be displayed on the aggregate view, based on the selected document. This is indicated by block 197. For instance, aggregate view generator 136 can access document-to-document mappings 156 that have already been configured by the user, to identify the set of documents (from the superset) to be displayed. This is indicated by block 199. The set of documents to be displayed from the superset of documents can be done in other was as well, and this is indicated by block 200. In another example, the documents to be displayed are simply the superset of documents. That is, all of the documents in the superset can be displayed on the aggregate view.

Once the set of documents to be displayed on the aggregate view is identified, data extraction component 128 extracts summary information from each of the related documents, that are to be displayed on the aggregate view. This is indicated by block 202 in FIG. 2. In doing so, data extraction component 128 can access the document-to-summary mappings 158 that were previously configured by the user to identify the summary information that the user wishes to see on the aggregate view. This is indicated by block 204. Of course, the summary information can be identified in other ways as well, and this is indicated by block 206.

Aggregate view generator 136 then generates the aggregate view, with the summary information that has been extracted, and controls display system 125 so user interface component 144 displays the aggregate view of the set of documents to be displayed, with the extracted summary information. This is indicated by block 208.

In one example, when the aggregate view is displayed, it is displayed as a plurality of different document display panes, one pane corresponding to each document that is displayed. Also, when the panes are initially displayed, the pane for the selected document (or driving document) can be under focus or otherwise selected. Therefore, data extraction component 128 extracts a first level of more detailed information (in addition to the summary information) from the selected document. This is indicated by block 210. For instance, it can access document-to-detail mappings 160 to identify a first level of more detailed information that is to be displayed on the document display pane for the selected document, in addition to the summary information. This is indicated by block 212. The first level of detail information can be identified in other ways as well, and this is indicated by block 214.

Process identifier component 134 then identifies any process to which the selected (or driving) document belongs. This can be done by accessing the document and process relationship information 176 for the selected document. This is indicated by block 216.

Aggregate view generator 136 then generates the aggregate view of the selected document and the set of related documents to be displayed, along with the first level detail information for the selected document, and controls display system 135 so user interface component 144 displays the aggregate view. This is indicated by block 218 in FIG. 2. As is briefly described above, security component 138 can also apply security or permissions. This is indicated by block 220. The aggregate view can be displayed as a pannable (horizontally scrollable) view, as indicated by block 222. Each of the panes corresponding to the related documents can be displayed as vertically scrollable panes. This is indicated by block 224. A filter pane can also be generated and displayed in the aggregate view. The items in the filter pane can be based upon the selected document. This is indicated by block 226. A process ribbon (or other display) can be generated to identify the steps in the process to which the selected document belongs. This is indicated by block 228. Some of the information on the panes can be displayed as navigable links. When the user actuates them, the user can be actuated to the underlying document that contains the information. This is indicated by block 230. An underlying data (e.g., view switching) actuator can also be displayed. When the user actuates this, view switching component 130 can switch information that is displayed on each of the panes to include disparate, underlying data, from the data tracking system 116. This is indicated by block 232. The display can also have an export actuator that can be actuated to export information. When it is actuated, export component 140 exports the displayed information into a desired format, such as to a printer, to a spreadsheet, etc. Displaying an export actuator is indicated by block 234. The aggregate view can include other items as well, and this is indicated by block 236.

Figure 3A:
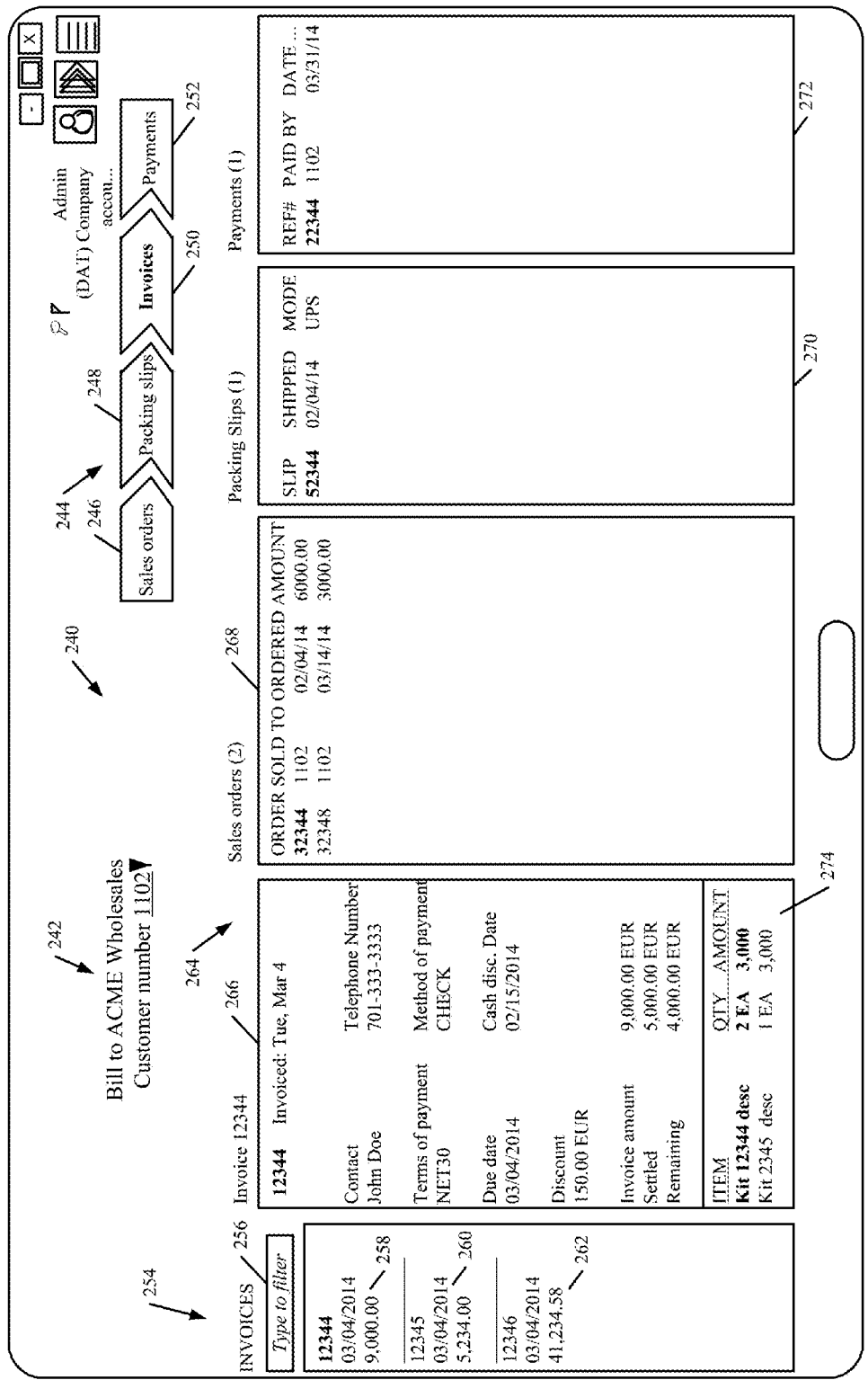
FIGS. 3A-3L show examples of user interface displays.

FIG. 3A shows one example of a user interface display that represents an aggregate view 240. In the aggregate view 240, the user has selected, as the driving document, an invoice identified as Invoice 12344. Aggregate view 240 illustratively includes an overall category identifier 242. In the example shown, the overall category identifier 242 is underlying data that identifies a customer, by name and customer number. Display 240 also illustratively includes a process ribbon 244. The process ribbon identifies the various documents in a process 166, to which the invoice document belongs. Process ribbon 244, for instance, includes a user actuatable display element 246 that represents one or more sales orders, actuator 248 that represents one or more packing slips, actuator 250 that represents one or more invoices, and actuator 252 that represents one or more payments. The actuators in ribbon 244 can be actuated by the user to re-arrange the items on view 240, to modify them or change focus.

In addition, because the user has selected, as the driving document, an invoice, aggregate view 240 illustratively includes a filter display 254. Filter display 254 is arranged to filter based on documents of the same type as the driving document. Therefore, filter 256 allows the user to filter the information displayed in aggregate view 240 based on invoice numbers. Filter display 254 thus includes a user input mechanism that allows the user to enter and search for an invoice, by invoice number, and it also includes user input mechanisms 258, 260, and 262, that are user actuatable display elements that allow the user to change the information displayed in display 240 to correspond to a different invoice, by actuating one of the display elements (e.g., 260 or 262).

FIG. 3A also shows that, in one example, aggregate view 240 includes a set of document display panes 264. Display panes 264 include one display pane for each of the documents that are displayed in response to the user selecting an invoice as the driving document. Therefore, it includes a first display pane 266 that represents the selected or driving document (e.g., Invoice 12344). It also includes a second display pane 268 that represents sales orders that are related to the selected invoice. Display pane 270 represents packing slips that are related to the selected invoice, and display pane 272 represents payment documents that are related to the selected invoice.

Each of the display panes 266-272 initially has a set of summary information displayed thereon. The particular summary information that is displayed on any given type of display pane is illustratively user configurable. Therefore, when the user configures the document-to-summary mappings 158 (shown in FIG. 1), this will indicate the particular fields or particular summary information that is to be displayed on each type of display pane. Thus, it can be seen in FIG. 3A that, when an invoice pane is displayed, to represent one or more underlying invoice documents, the summary information initially includes not only the invoice number and the date of the invoice, but a variety of other information, such as the contact, telephone number, terms of payment, method of payment, due date, etc. The summary information initially displayed for a sales order pane 268 includes an order number, an account number of who the order was sold to, a date ordered, and an amount of the sales order. The summary information initially displayed on a packing slip pane includes the slip number, the date it was shipped, and the mode of shipment. The information displayed on a payments pane includes a reference number, a customer number of a customer who made the payment and the date that the payment was made.

In addition, in one example, each of the display panes 268-272 is selectable by the user. When the user selects one of the panes, then a first level of more detailed information is displayed on that pane. For instance, detailed view generator 132 accesses the document-to-detail mappings 160 to identify the first level of detail information that is to be displayed when the user actuates one of the display panes. It can be seen that, in FIG. 3A, the invoice display pane 266 is actuated (or under focus or otherwise selected) by the user. Therefore, a first level of detail is displayed in the lower portion 274 of the invoice display pane 266. The additional level of detail, in the example shown, includes an item number represented on the corresponding invoice document, a quantity of that item number, and an amount corresponding to each of those items. As is described below, if the user were to place under focus or otherwise actuate any of the other display panes 268-272, then detailed view generator 132 will identify first level detail information corresponding to those panes as well, and the first level detail information will be extracted and displayed on the corresponding pane.

Figure 3B:
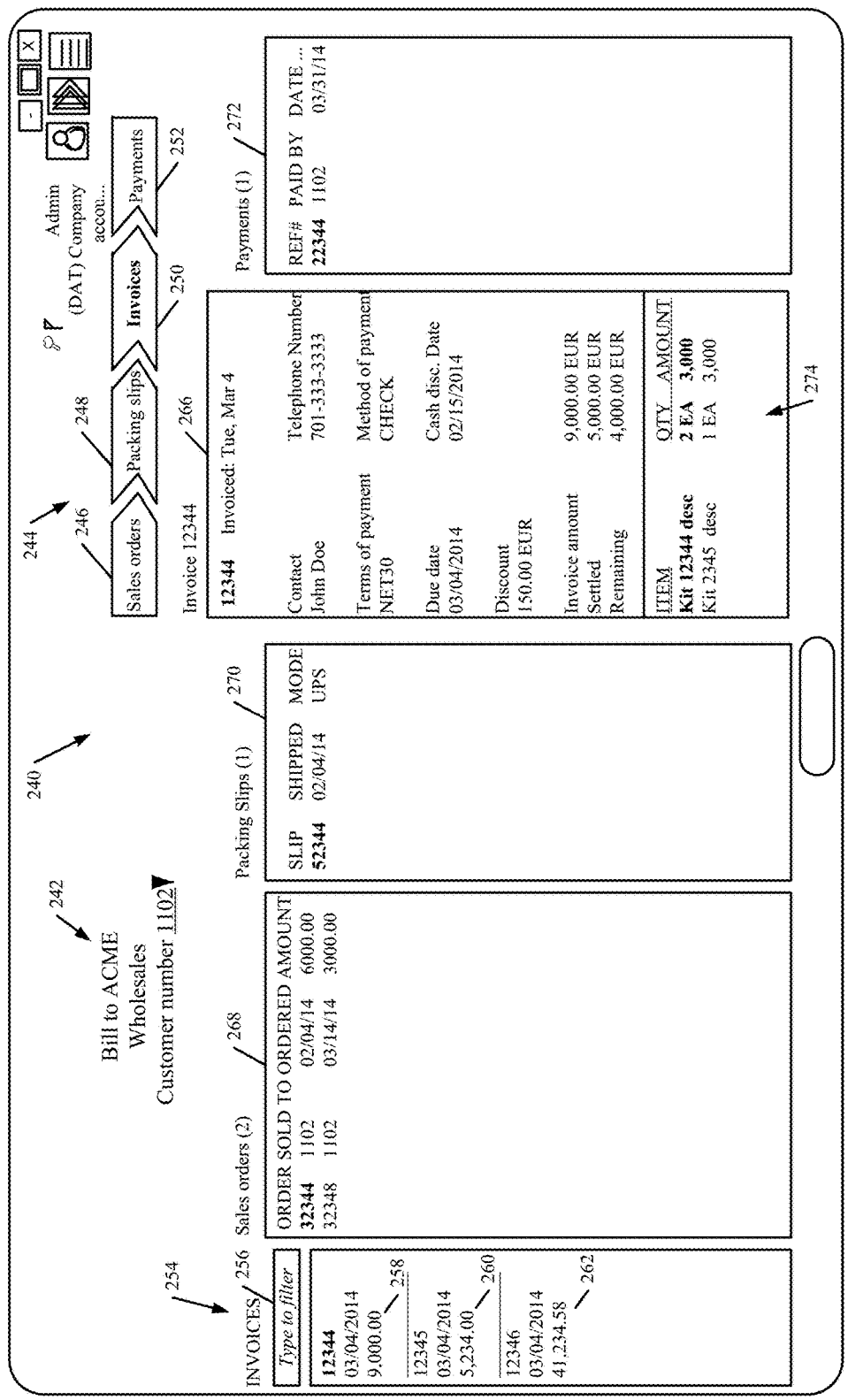

In the example shown in FIG. 3A, the panes 266-270 are identified in process ribbon 244, except that the pane corresponding to the selected document (invoice pane 266) is displayed first. This need not be the case, however. For instance, FIG. 3B shows aggregate view 240 shown in FIG. 3A, except that panes 266-272 are displayed in a different order. They are displayed in the same order as shown in process ribbon 244. Of course, the panes can be displayed in other orders as well.

Similarly, the panes shown in FIGS. 3A and 3B can be displayed on a horizontally scrollable display surface. Therefore, if additional panes are displayed in the aggregate view, they may be off screen to the right. In that case, a scrollbar (or other control) is provided so that the user can scroll to the left or right on the display to reveal different panes. Similarly, the panes can be either individually vertically scrollable, or vertically scrollable as a group, or arranged in other ways.

Figure 3C:
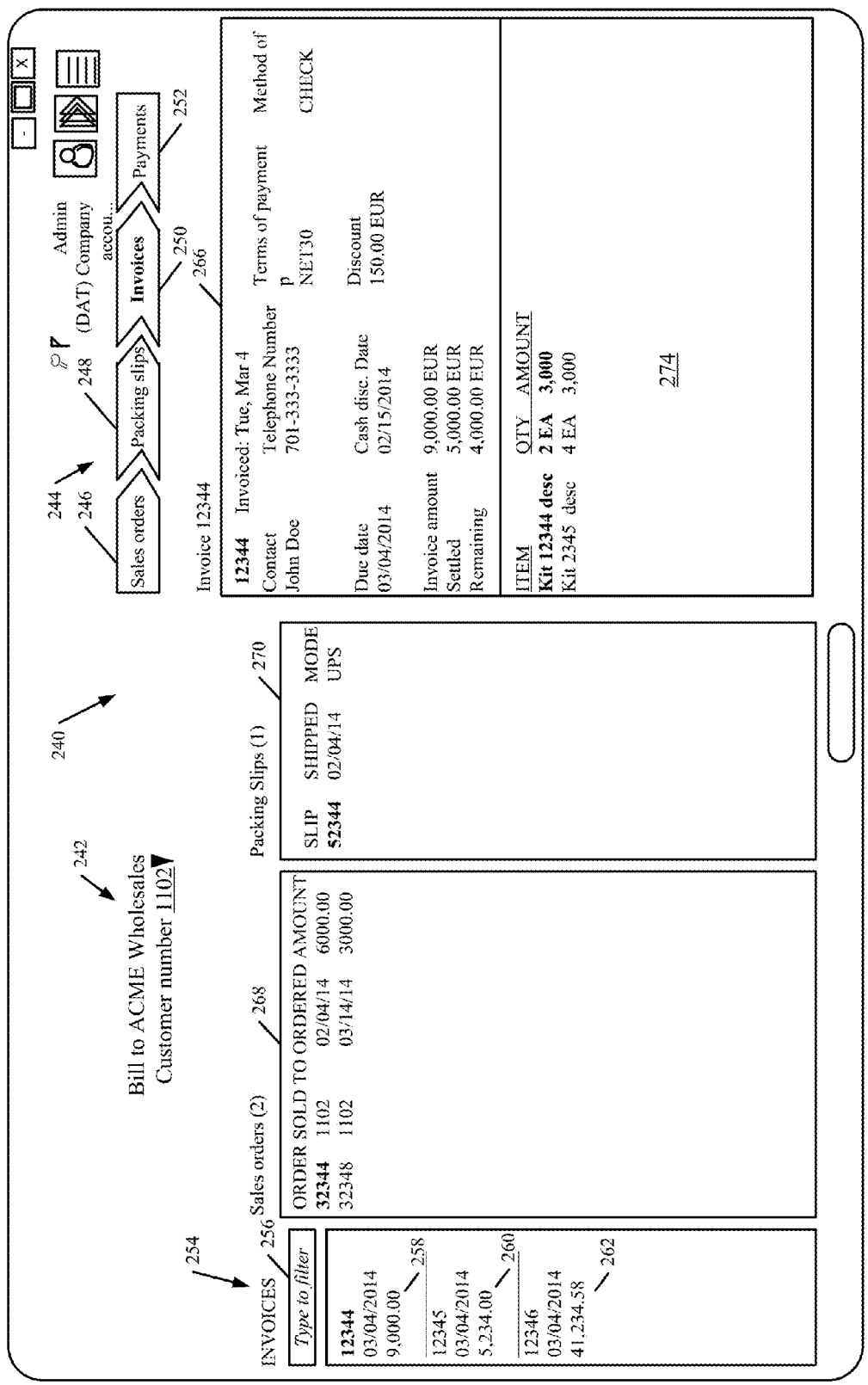

FIG. 3C shows yet another example of display 240. It can be seen in FIG. 3C that the pane corresponding to the driving document (e.g., invoice pane 266) can have a different display format than the other panes in the aggregate view. Pane 266 is shown in FIG. 3C as having a horizontally expanded display configuration. This can be used to display additional summary or detail information, or for other reasons.

Continuing on with the flow diagram of FIG. 2, once the aggregate view 240 is displayed, the user can interact with the aggregate view in a wide variety of different ways. This is indicated by block 280 in the flow diagram of FIG. 2. A number of those interactions will now be discussed for the sake of example.

Figure 3D:
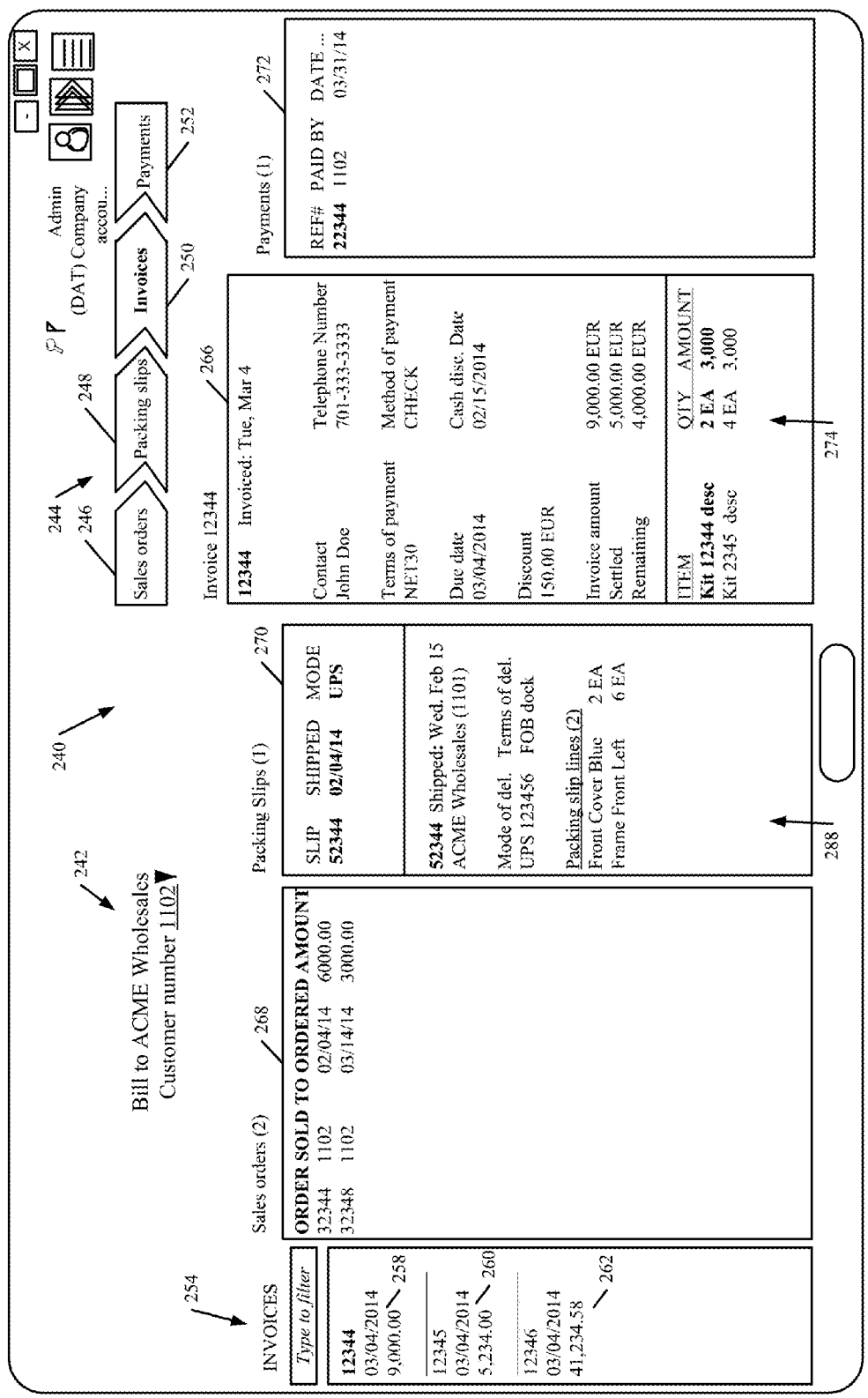
Figure 3E:
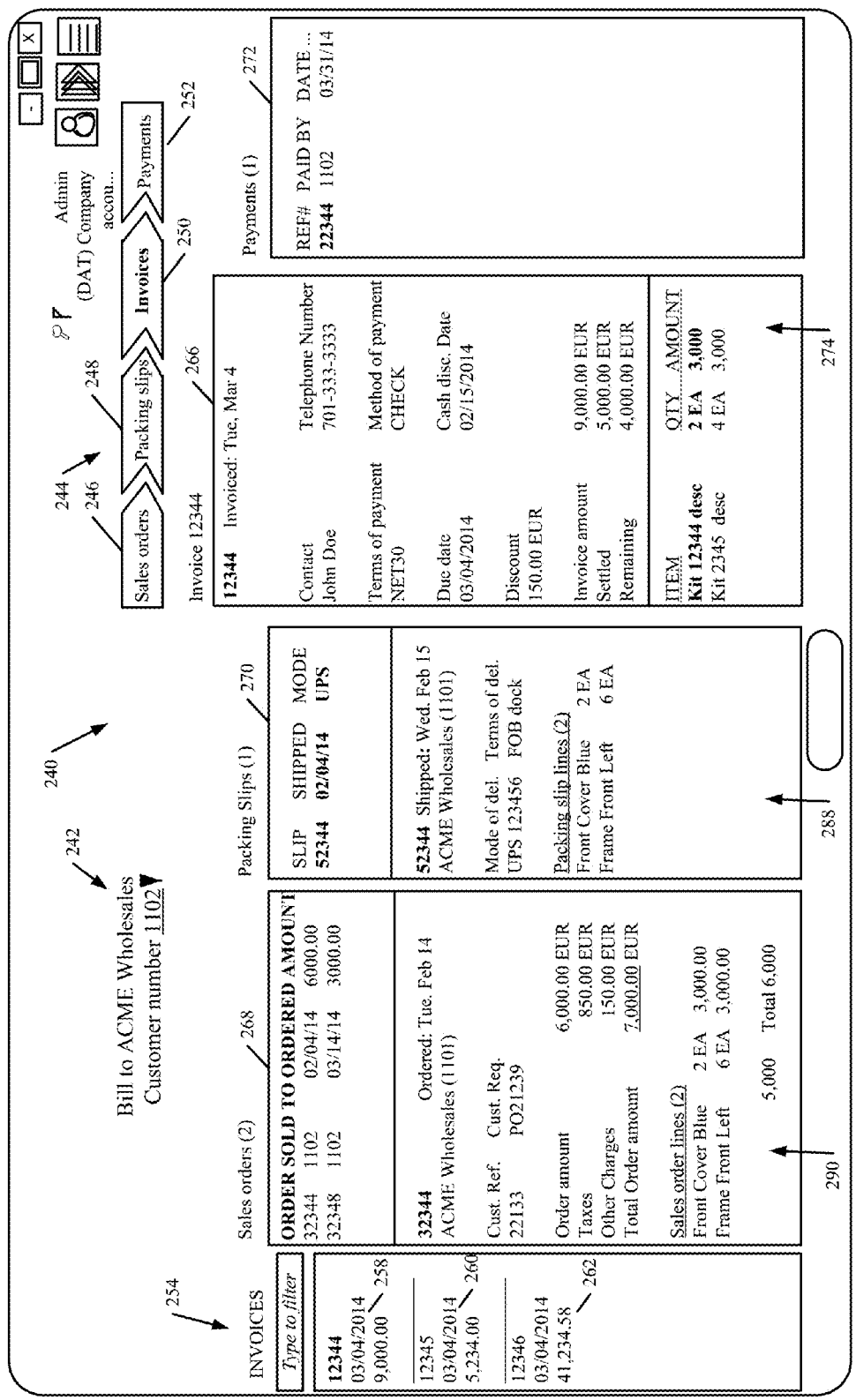
Figure 3F:
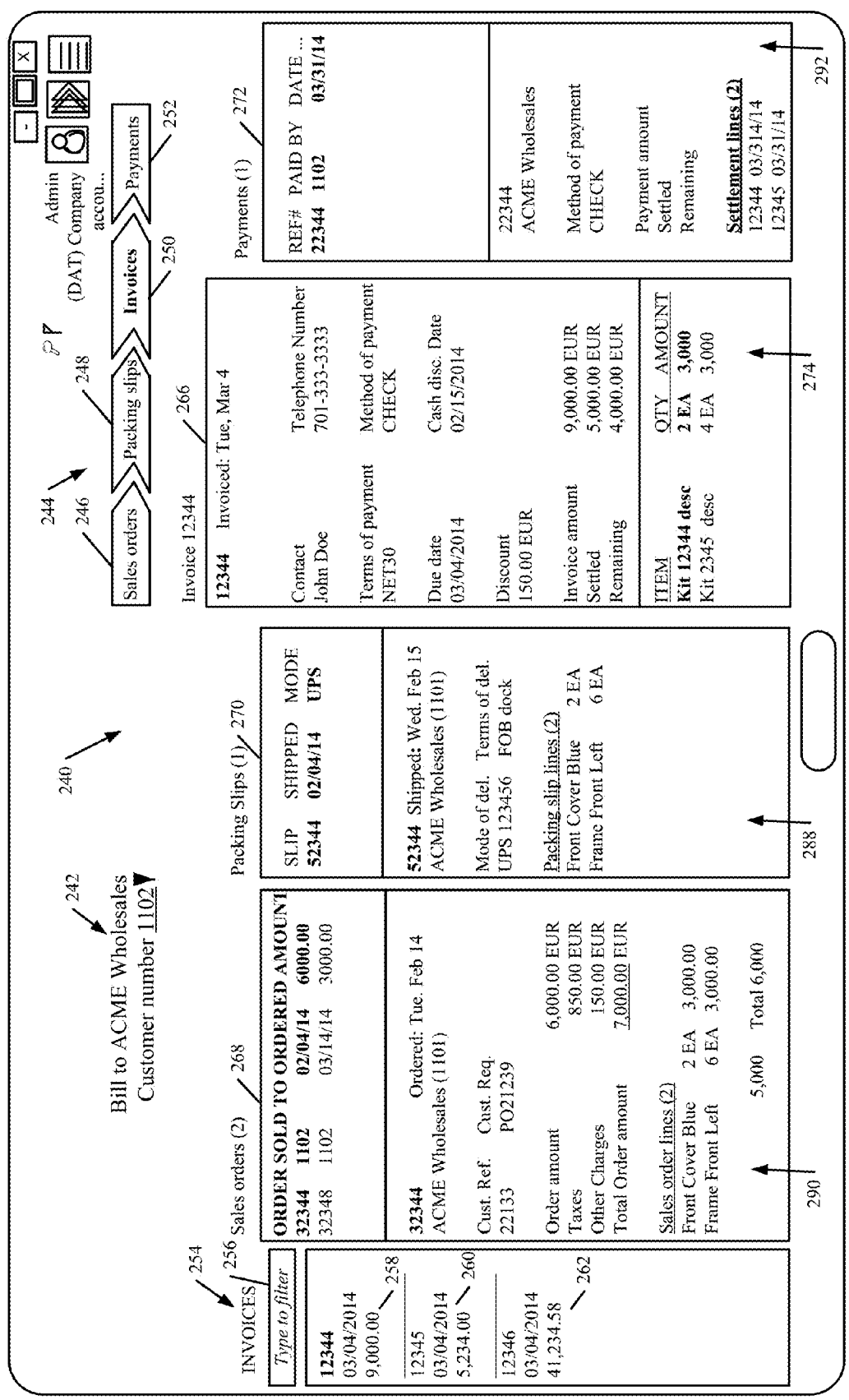

For instance, the user can select a document pane (or place it under focus, or otherwise actuate it). This is indicated by block 282. In response, detailed view generator 132 accesses document-to-detail mappings 160 to identify an additional level of detail for that pane so that it can be extracted and displayed. This is indicated by block 284. Aggregate view generator 136 will then generate the aggregate view, including the additional level of detail that was just extracted for the selected pane, and control display system 125 so user interface component 144 displays it. This is indicated by block 286. FIGS. 3D-3F show various user interface displays of aggregate view 240, that indicate this.

It can be seen in FIG. 3D, for instance, that the user has now actuated the packing slips display pane 270. Therefore, additional detailed information is now displayed on the lower portion of pane 270, as represented by block 288. The additional information can include, for instance, the date that the packing slip was shipped, who it was shipped to, the mode of delivery and terms of delivery, and other related packing slips, etc. Of course, this is only one example of the additional detail that can be displayed on a packing slip pane 270 that represents a packing slip document.

FIG. 3E is similar to FIG. 3D, except that it now shows that the user has also actuated (placed under focus, or otherwise selected), the sales orders pane 268. Therefore, detailed view generator 132 identifies an additional level of detailed information for the sales order display pane 268 so it can be extracted and displayed generally on the lower portion of display pane 268, as illustrated generally at 290. The additional level of detailed information can include a customer that placed the sales order, the date it was placed, various reference numbers, the order amount, taxes, other charges, total order amount and other sales orders. Again, of course, this is only one example of additional detailed information that can be extracted and displayed on a sales order display pane 268.

FIG. 3F is similar to FIG. 3E, except that it can now be seen that the user has actuated (or placed under focus, or otherwise selected) payments display pane 272. Therefore, detailed view generator 132 identifies an additional level of detailed information (shown generally at 292) for the payments pane 272 that represents one or more payment documents. In the example shown in FIG. 3F, the additional level of detailed information includes an identifier of who made the payment, the method of payment, the amount made, the amount settled, any amount remaining, and any other settlement lines that are relevant to the payment. Of course, again this is only one example of a set of additional detailed information that can be displayed on a payments display pane 272.

Figure 3G:
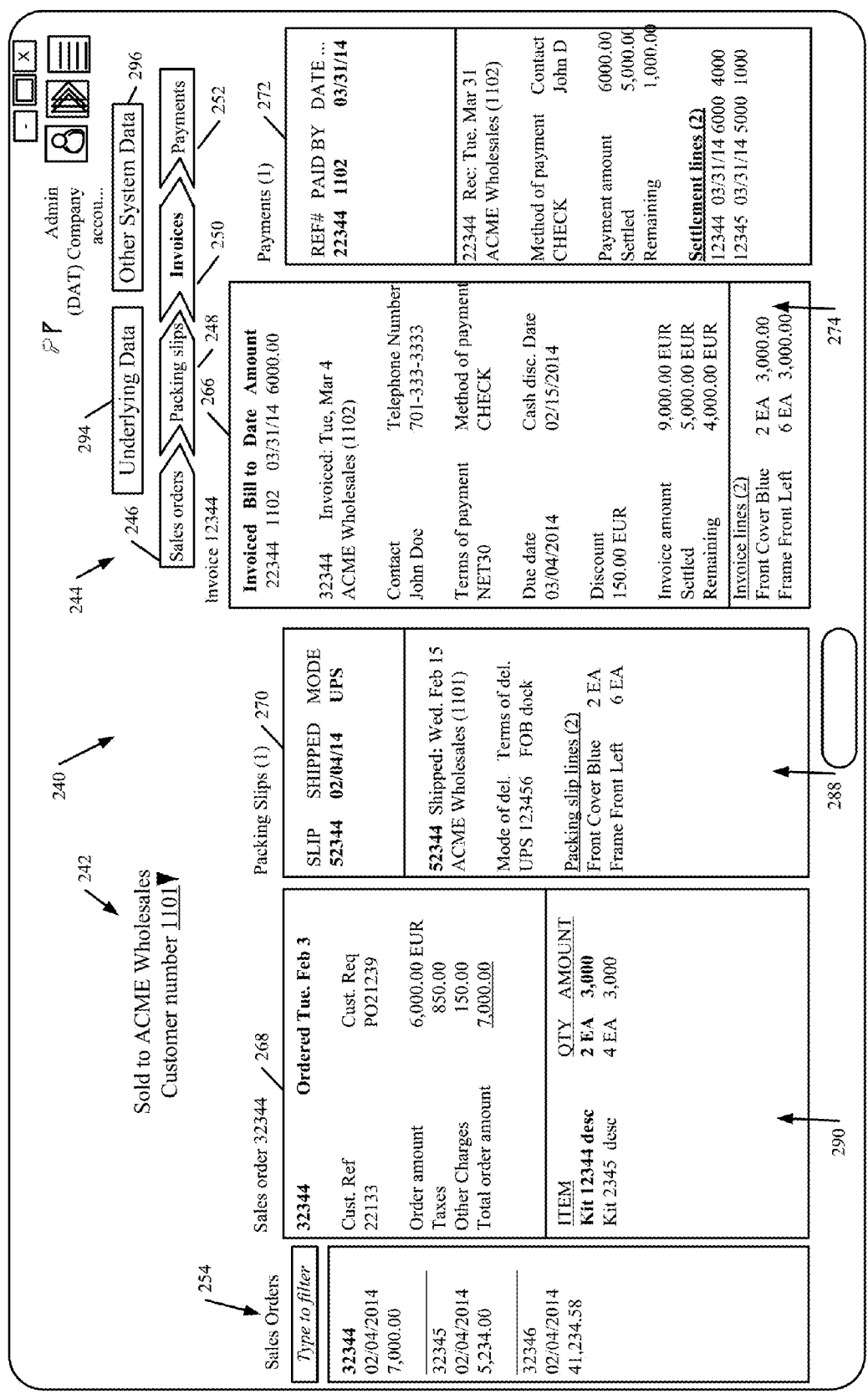

FIG. 3G shows another user interaction. In FIG. 3G, it can be seen that the user has now actuated the "sales order" user input mechanism 246 in the process ribbon 244. This has the effect of changing the selected document to the sales order document. Therefore, the sales order document display pane 268 is now displayed at the far left of aggregate view 240, and the filter display mechanism 254 is now changed to allow the user to filter the display based upon sales order documents, instead of invoice documents. This is because the driving document is now the sales order document and not the invoice document.

FIG. 3G also shows another example. FIG. 3G shows that view 240 can include an underlying data actuator 294 and another system data actuator 296. When the user actuates either actuator 294 or 296, then the additional level of detailed information displayed on each of the display panes switches from detailed information from the same computing system (e.g., from transactional system 114), to disparate data from a corresponding disparate computing system (e.g., from data tracking system 116). In one example, for instance, the underlying data 170 can be general ledger data or other accounting data that is tracked within computing system 102. Thus, instead of displaying detailed information from the documents in transactional information 174, when the user actuates actuator 294, the more detailed information is displayed from the general ledger.

Figure 3H:
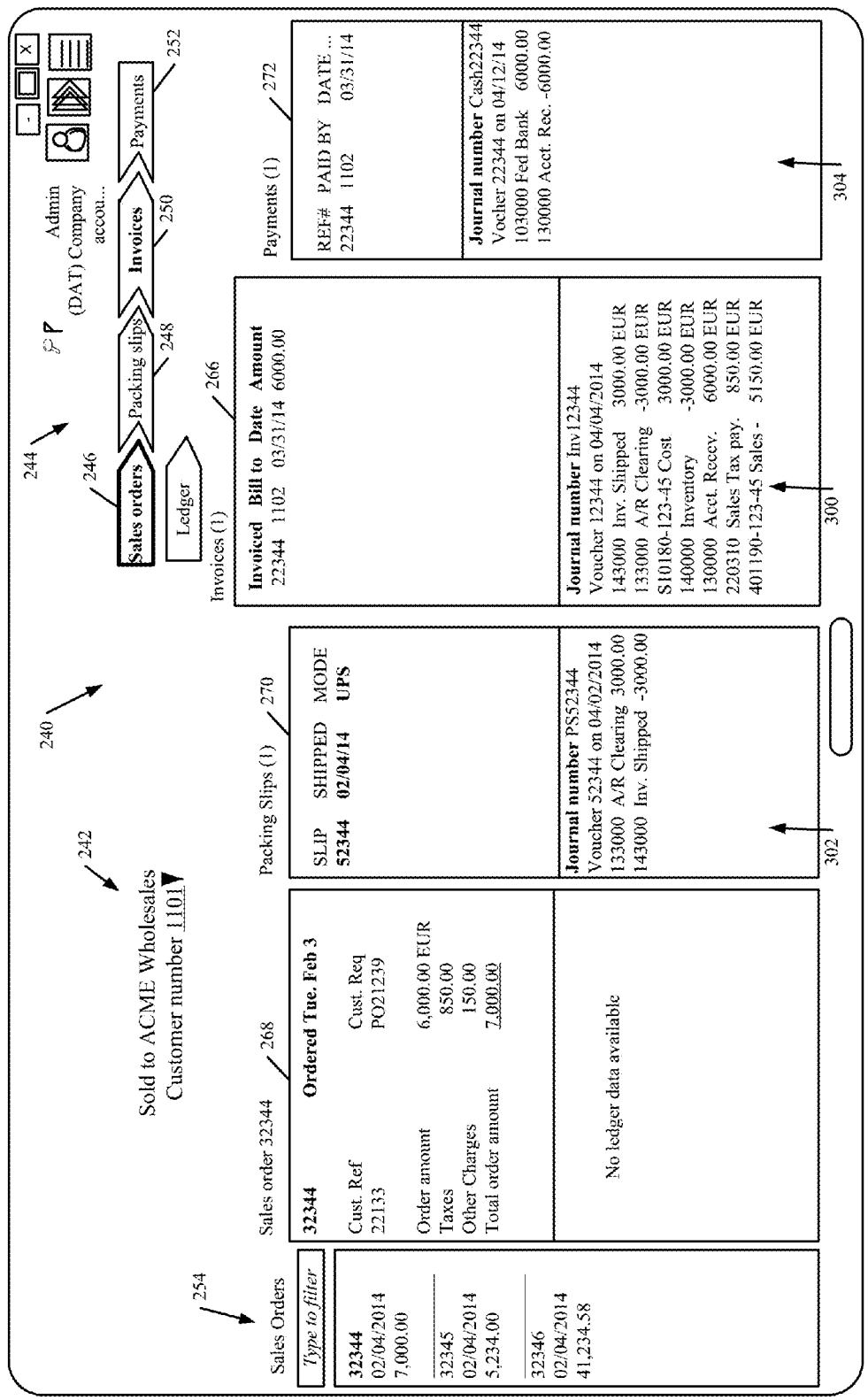

FIG. 3H shows one example of this. FIG. 3H is similar to FIG. 3G, and similar items are similarly numbered. However, it can now be seen that the more detailed information displayed on the lower half of the display panes 266-272 now shows journal entry information that was entered in a corresponding journal, general ledger, or other underlying data 170 related to the documents represented by the document display panes 266-272. For instance, invoice display pane 266 now has more detailed information 300 that corresponds to journal postings that are related to the invoice(s) represented by invoice display pane 266. Sales order display pane 268 indicates that no additional detail information from the general ledger is available for the sales order. Display pane 270 includes more detailed information 302 that shows journal entries corresponding to the identified packing slip document(s), and payments display pane 272 includes more detailed information 304 that identifies journal entries related to the payments document(s) represented by display pane 272. Of course, if there is another disparate computing system, it can also have data related to the documents represented by the display panes. Therefore, it can have a corresponding actuator 296. When that actuator is actuated by the user, then view switching component 130 obtains the more detailed information from the other, disparate computing system, and displays that on the relevant display panes.

Referring again to FIG. 2, actuating the underlying data (or view switching) actuator (294 or 296) is indicated by block 306. Extracting related, underlying data from the disparate system is indicated by block 308 and displaying the underlying data (e.g., the disparate date) on the relevant display panes is indicated by block 310.

Continuing on with the description of the flow diagram in FIG. 2, the user can also illustratively view even more detailed information by interacting with the aggregate view 240 in another way. For instance, if the user hovers the cursor (or other pointing device) over a certain portion of the aggregate view, then detailed view generator 132 illustratively extracts more detailed information for the item over which the cursor is being hovered. It then displays that information to the user, without the user ever having to leave the aggregate view. Hovering over an item of data on the aggregate view is indicated by block 312. Extracting an additional (e.g., a second) level of detail for that data item is indicated by block 314, and displaying the second level of detail in a transitory (e.g., a popup) display, is indicated by block 316. FIGS. 3I-3L show examples of this.

Figure 3I:
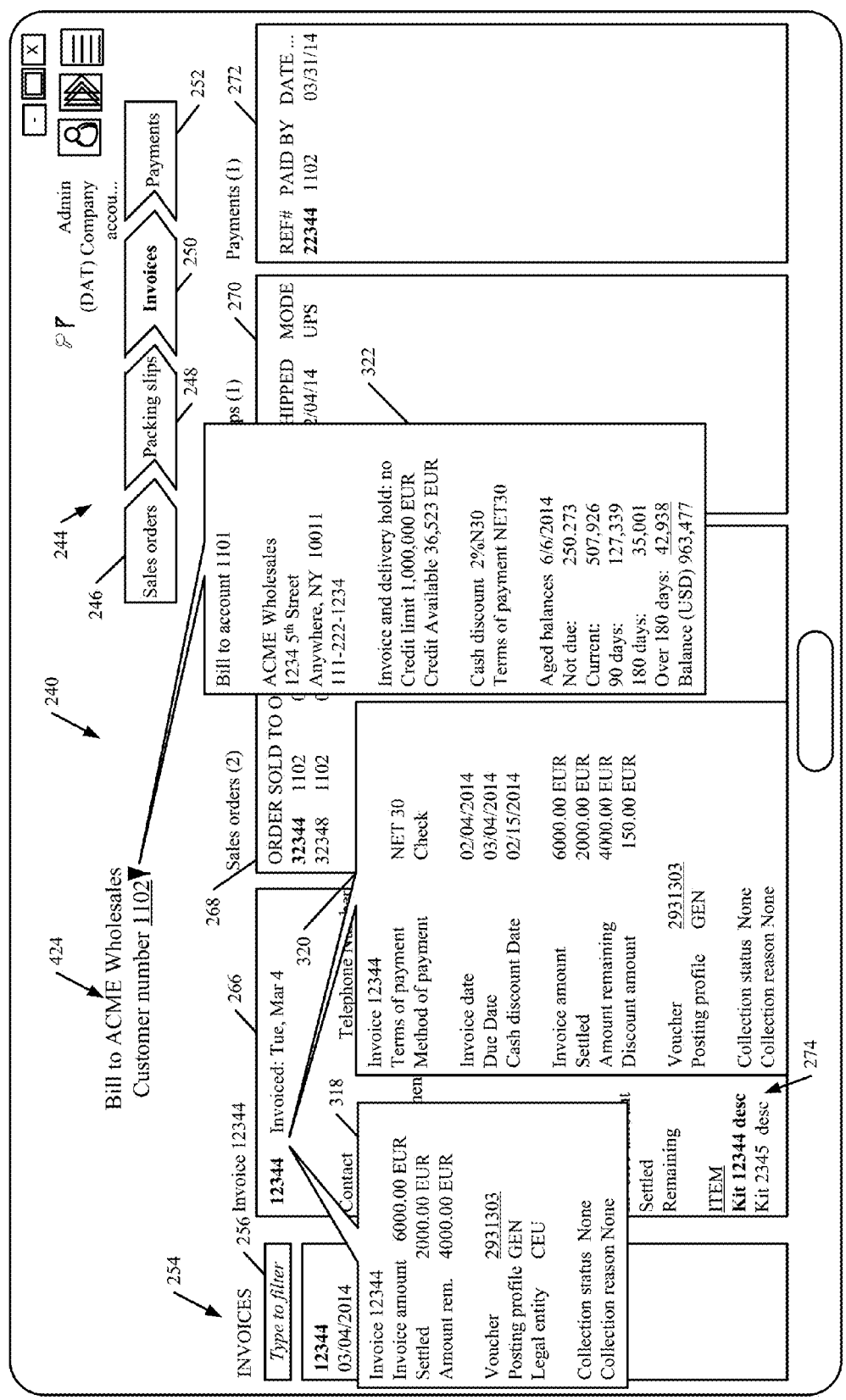

FIG. 3I shows a number of different examples. In FIG. 3I, in accordance with one example, if the user hovers the cursor over the invoice number 12344 in invoice display pane 266, then detailed view generator 132 identifies detailed information corresponding to that invoice by accessing document-to-detail mappings 160. These mappings indicate what information is to be displayed when the user hovers over a given data item on an invoice display. In one example, the information is extracted by data extraction component 128 and included in a popup display by aggregate view generator 136 which controls system 124 and user interface component 144. In a first example, the specific information shown in popup display 318 is displayed. It can be seen that the additional detailed information includes the invoice number and amount, the amount settled, the amount remaining, a voucher number, a posting profile and legal entity, as well as collection status. FIG. 3I shows another example in which the information in the popup display is shown in display 320. In that example, the more detailed information is different from that displayed in the example popup display 318.

FIG. 3I also shows an example of a more detailed information display that can be generated when the user hovers the cursor over the customer number on display 240. One example of this is shown in popup display 322. It can be seen that the popup display aggregates information from a wide variety of different sources for the customer identified by the customer number over which the cursor is being hovered. It can aggregate accounts receivable, payment terms, credit limits, as well as master record data (such as customer name and address, etc.). Of course, these are only examples of the additional information that can be generated in a popup display, when the user hovers a cursor over an item of data on the display.

Figure 3J:
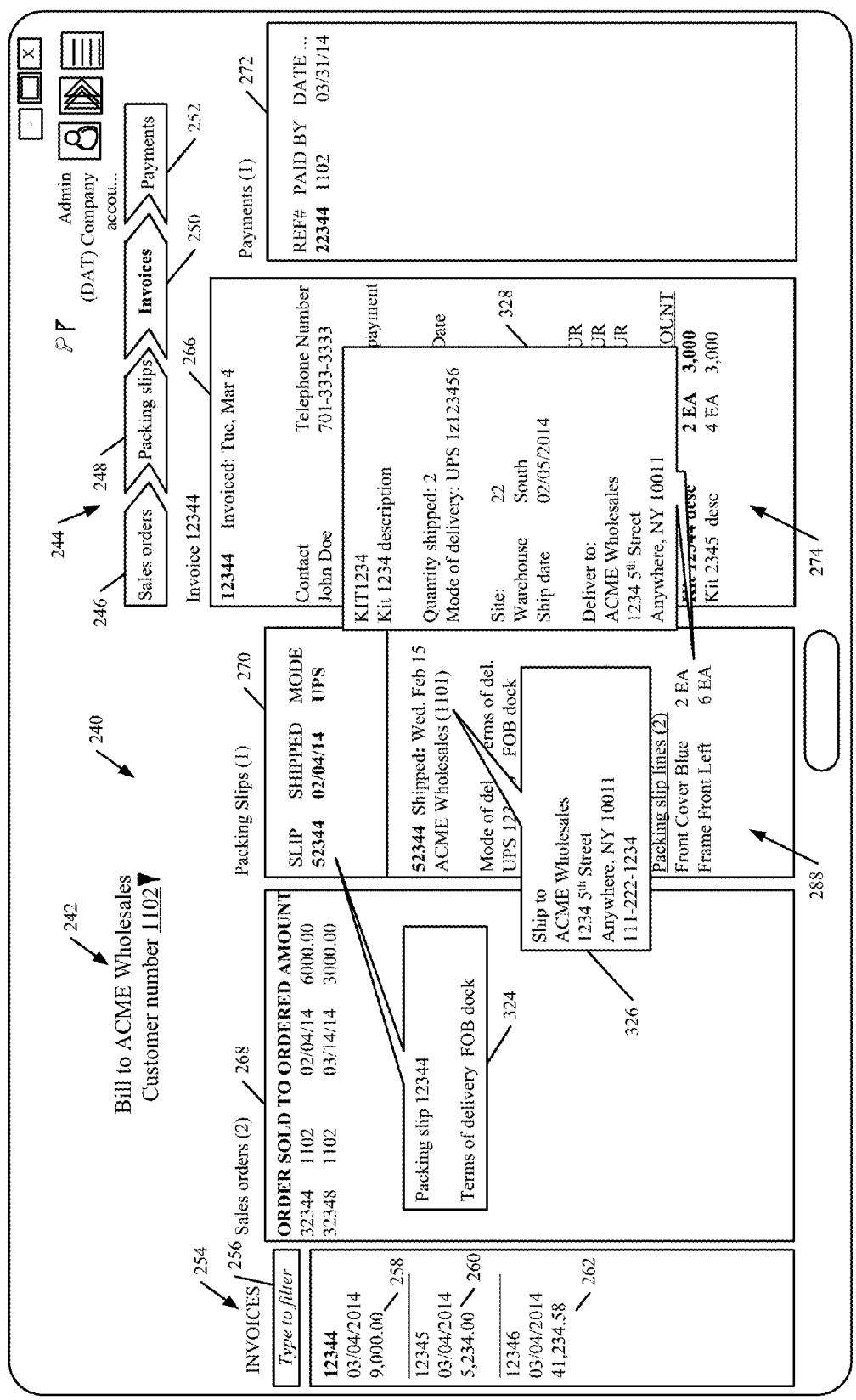

FIG. 3J shows another example, where the user hovers the cursor over a packing slip identifier. In that case, popup display 324 can be generated. When the user hovers the cursor over a customer number on the packing slip display pane 270, then a popup display pane 326 can be generated. It will be noted that the popup display 326 may contain different information for the corresponding customer number than is displayed when the user hovers the cursor over the customer number at the top of aggregate view 240 (such as was shown with respect to popup display 322 in FIG. 3I). FIG. 3J also shows that popup display 328 can be generated to show additional information for packing slip lines.

Thus, FIG. 3J shows that three or more different levels of detailed information can be displayed to the user without the user ever having to leave aggregate display 240. First, packing slip display pane 270 includes summary information displayed at the top of pane 270. However, because the user has actuated pane 270, it also displays the first level of detail 288 described above with respect to FIG. 2D. Further, if the user hovers the cursor over the summary information in display pane 270, then even further detailed information is displayed in popup window 234. Additionally, if the user hovers the cursor over an item of data in the first level detail information 288, then even a further level of detailed information is displayed, such as that shown in popup windows 326 and 328. Thus, three or more levels of detail can be displayed, based on user interactions, without the user ever leaving aggregate view 240.

Figure 3K:
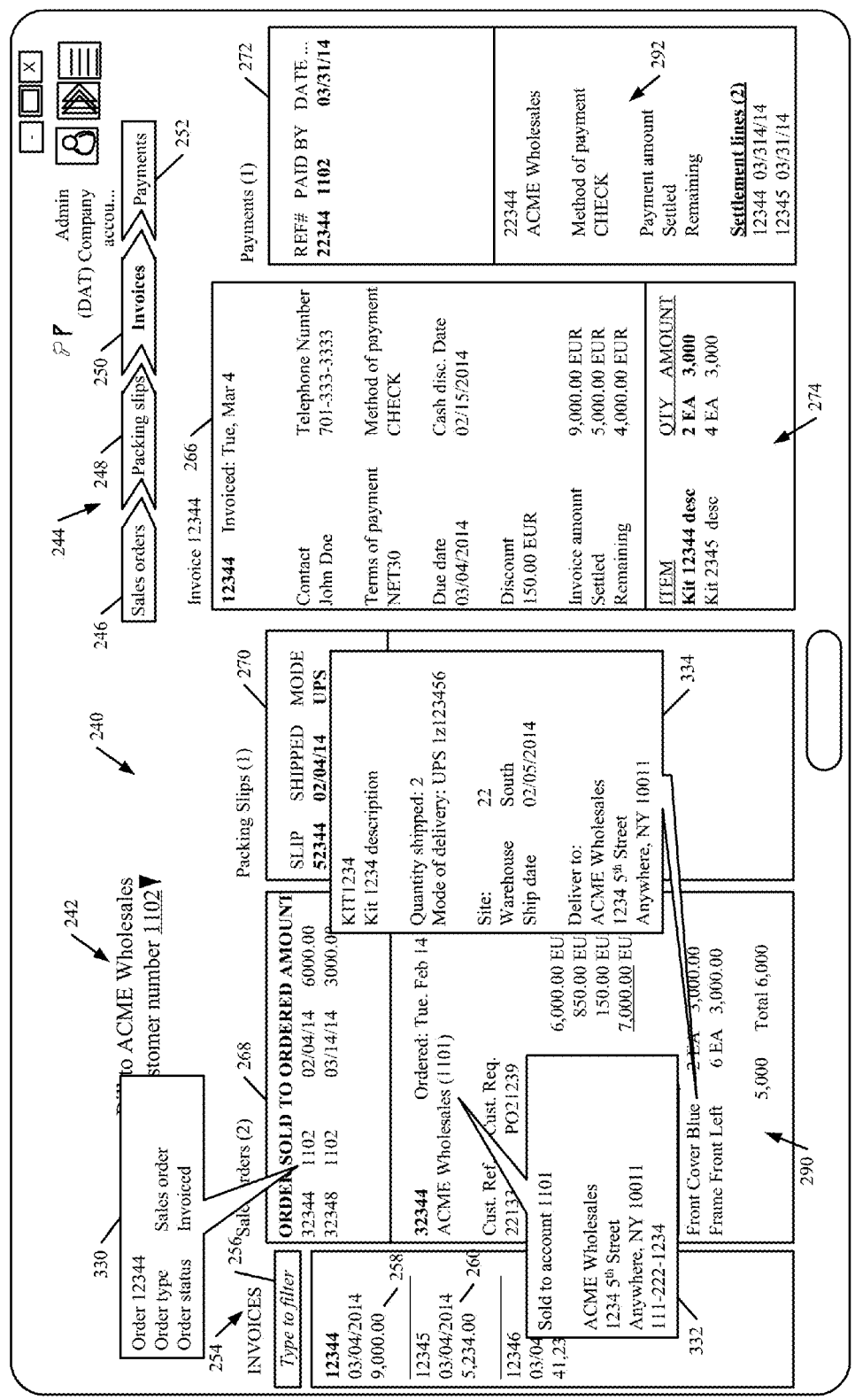
Figure 3L:
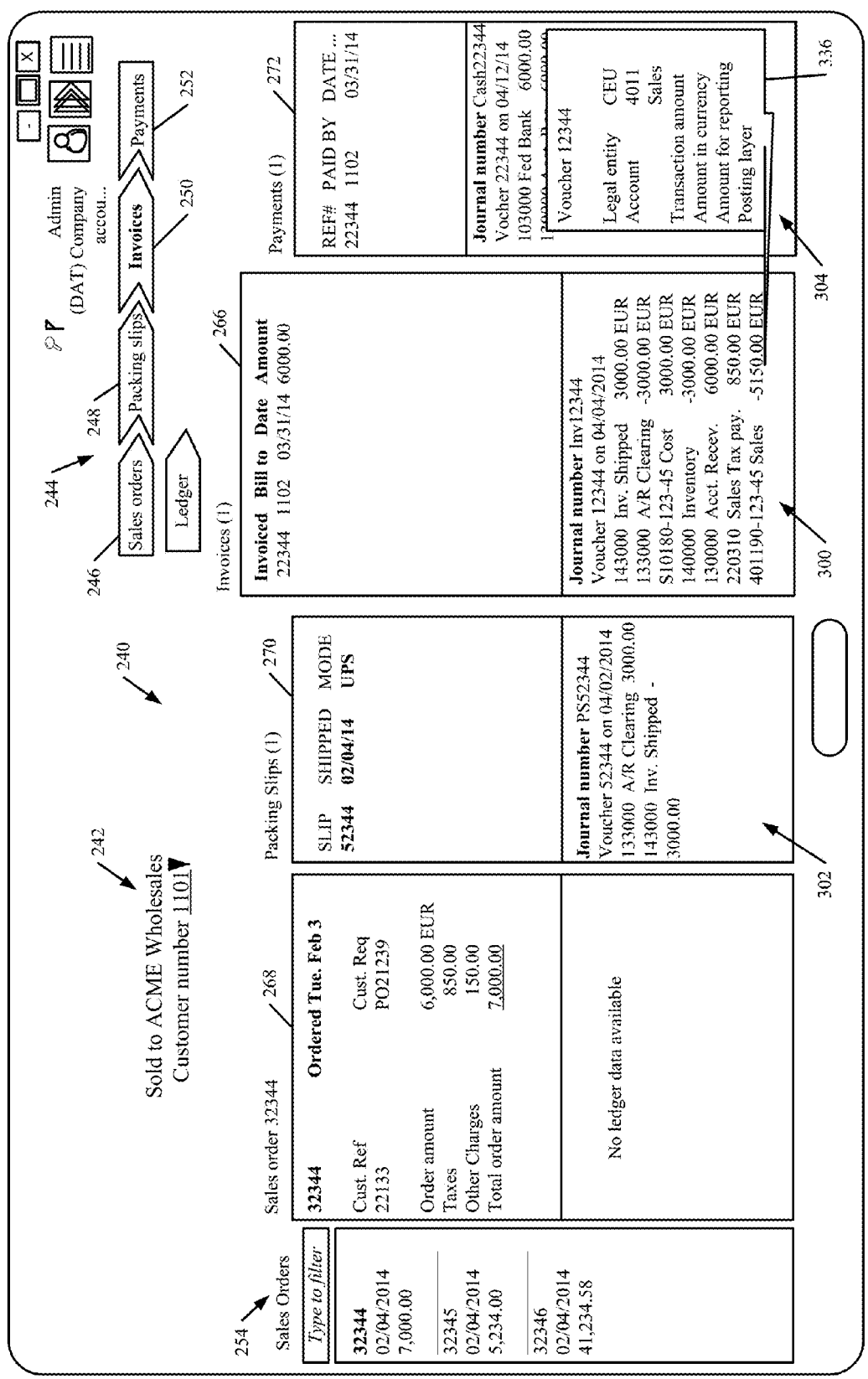

FIG. 3K is similar to FIG. 3J, except that it shows examples of popup displays that can be generated when the user hovers the cursor over a sales order display pane 268. Popup display 330 displays more detailed information for a particular sales order identified in the summary information for sales order display pane 268. Popup display 332 shows more detailed information when the user hovers the cursor over an account number in the sales order display pane 268, and popup display 334 shows one example of more detailed information that can be displayed when the user hovers the cursor over a line item in the more detailed information 290 on the popup display pane 268. Again, these are only examples of the more detailed information that can be extracted and displayed.

FIG. 3L shows that hovering a cursor over a data item on one of the display panes can be used to generate an additional level of detail, not only when the information displayed is from the transactional system, but also when it is displayed from a disparate system. For instance, FIG. 3L is similar to FIG. 3H in that the more detailed information corresponding to each of the display panes 266-272 now corresponds to journal entries from underlying data tracking system 116 and thus represents disparate, underlying data 170. However, when the user hovers the cursor over any of the data items from the disparate system, then a more detailed display is generated for that data item. For instance, it can be seen in FIG. 3L that the user is now hovering the cursor over a journal entry number 401190-123-45 in the more detailed information 300 on the lower portion of invoices display pane 266. In that case, detailed view generator 232 accesses corresponding detail mappings to identify the additional level of detail information that is to be displayed for a journal entry, and generates popup display 336. This indicates that, no matter what disparate source of data, or computing system, the data is displayed from in the aggregate view, the user can see even an additional level of detail for that item, without ever leaving the aggregate view.

Referring again to the flow diagram of FIG. 2, the user can take other actions as well. For instance, some of the information displayed on the aggregate view 240 is an actuatable link. Therefore, when the user actuates a link, computing system 102 will illustratively retrieve an underlying document or form corresponding to that link and open that form or document for the user. Actuating a link is indicated by block 340 and opening the form or document for the link is indicated by block 342.

In addition, the aggregate view can include one or more export actuators. For instance, the export actuators can correspond to exporting the information to a printer, exporting it to another application (such as a spreadsheet application), etc. When the user actuates the export actuator, export component 140 exports the data on the aggregate view to the corresponding application or device. Actuating the export actuator is indicated by block 344, and exporting the data is indicated by block 346.

It will be noted that, while a wide variety of user interactions with the aggregate view have been described herein, others can be detected as well. The system will then take appropriate action based upon those other user interactions. This is indicated by block 348.

Figure 4:
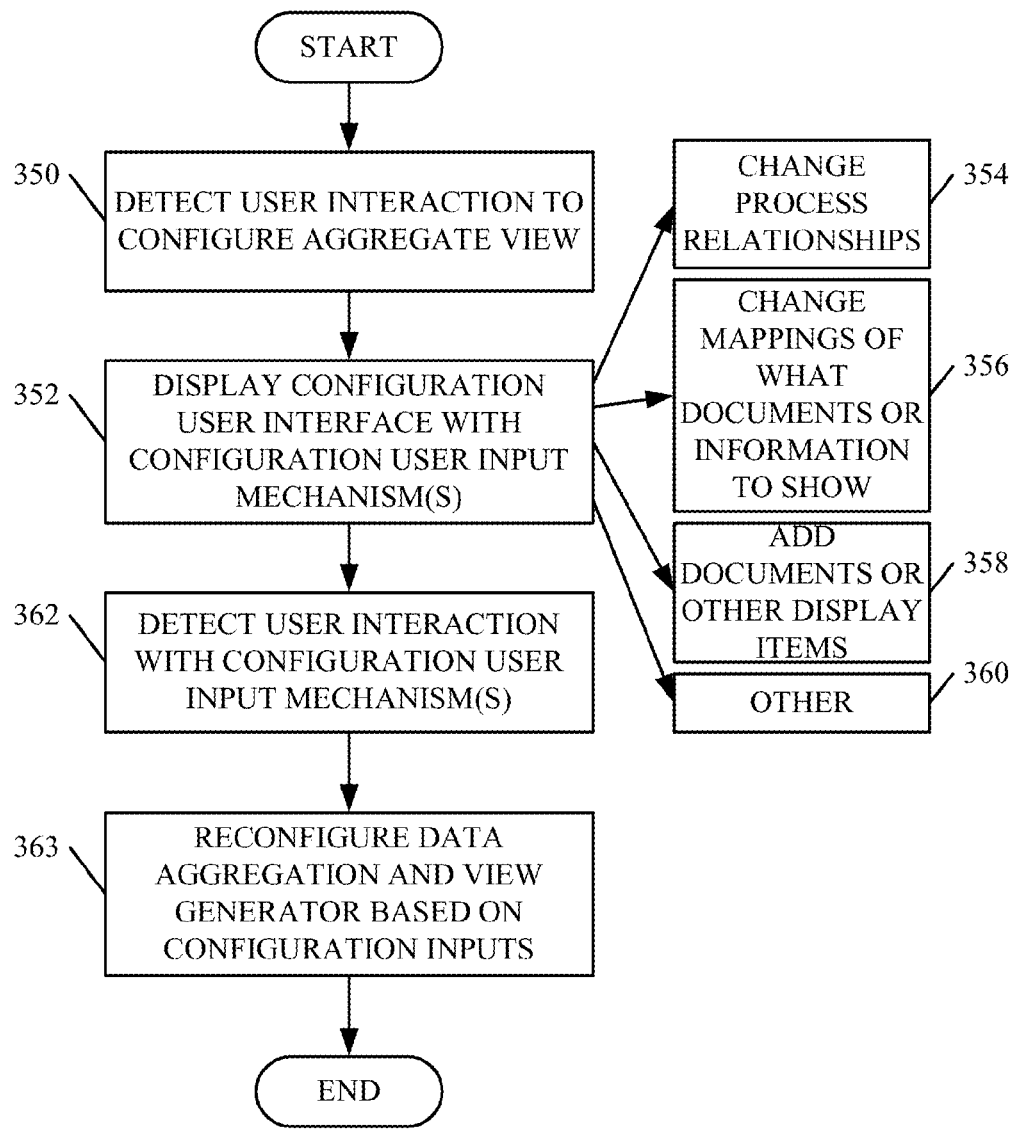
FIG. 4 is a flow diagram illustrating one example of the operation of a view configuration system shown in FIG. 1.

FIG. 4 is a flow diagram illustrating one example of the operation of view configuration system 120 in allowing user 108 to configure the aggregate view that is generated for the user. System 120 first detects a user interaction indicating that the user wishes to configure an aggregate view. This is indicated by block 350 in FIG. 4. In response, system 120 illustratively generates a configuration user interface display that includes configuration user input mechanisms. This is indicated by block 352. The user input mechanisms can be actuated by the user to receive a variety of different configuration inputs. For instance, the user input mechanisms can be actuated by the user in order to change the process relationships that define a process that a given document or transactional information item belongs to. This is indicated by block 354. The user input mechanisms can be actuated to change mappings of what documents or information to show. That is, they can be actuated to change mappings 156-160 (or other mappings) in aggregate view mappings 122. This is indicated by block 356. The user input mechanisms can also be actuated to add documents or other display items that are to be generated on an aggregate view. This can be helpful in systems that undergo customization before they are deployed. For instance, an independent software vendor may take a base software system and modify it by adding different types of documents or entities and then deploying it for an end user organization. Configuration system 120 can be used to configure generator 118 to display these additional documents or entities on an aggregate view as desired. This is indicated by block 358. The configuration user input mechanisms can be used to perform other configuration steps as well, and this is indicated by block 360.

Once those user input mechanisms are displayed, system 120 detects user interaction with one of the configuration user input mechanisms. This is indicated by block 362. The corresponding configuration component 148-154 then reconfigures the mappings 122 or the data aggregation in view generator 118, as needed, based on the user configuration inputs. This is indicated by block 364.

It can thus be seen that the present system greatly enhances computing system 102. For instance, the system that surfaces particular information in response to the user selecting a single driving document can be configured to surface relevant information, on a single display, from a variety of disparate data sources. In the past, this had been accomplished using multiple different instances of form designs to cover each case. The present system allows for a single form to show multiple different document-type relationships. In addition the retrieval of all documents in the relationship reduces network traffic to and from the server since all documents can be fetched and cached for review. For example, this avoids the need to perform multiple round trips to the database or computing systems in order to display a plurality of different forms for each of those items of data or documents, which improves system performance. Instead, they can all be displayed on a single form. This reduces computing resources in rendering information and thus improves the overall efficiency of the system. By using configuration tables (or mappings), the system allows a user to specify the order in which related document panes appear.

Further, because the system is configurable, ISVs or others can add their own document types to the existing data store so that they can be viewed in the aggregate view as well. The system also allows the documents to be highlighted or otherwise actuated to obtain more detailed information.

When the user hovers over a data item, even further detailed information can be extracted and displayed for the user. Again, the system can be configured to extract only the additional detailed information needed and it can be cached as well. This further reduces the network traffic, the load on the database, and processing resources needed to render this information.

In addition, by simply interacting with an actuator (such as an icon), the user can switch to displaying more detailed data from a disparate system. This greatly enhances the efficiency of the user, especially when attempting to research a transaction or audit financial documents.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
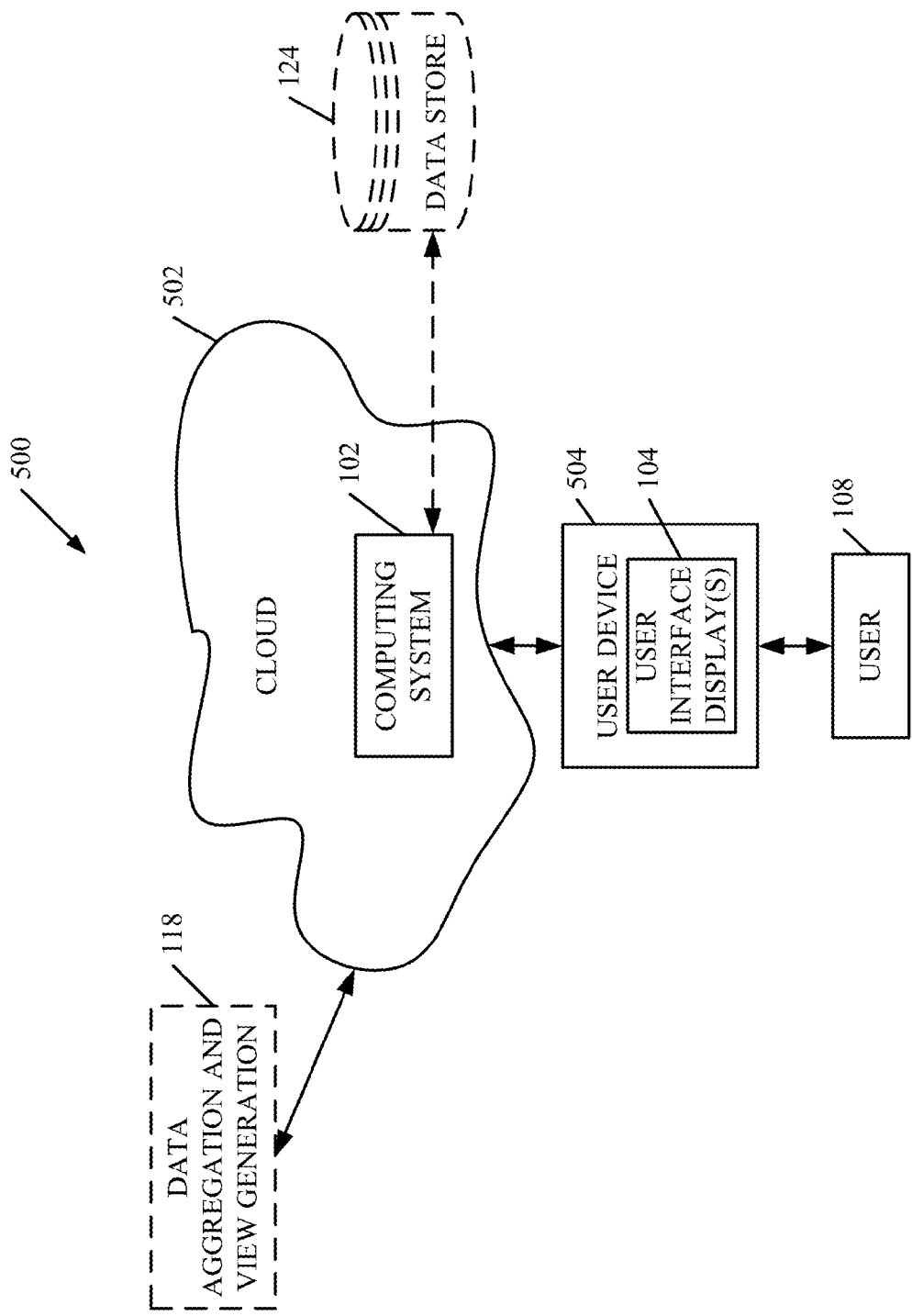
FIG. 5 is a block diagram of one example of the architecture shown in FIG. 1 deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that computing system 102 is located in cloud 502 (which can be public, private, or a combination where portions are public while others are private). Therefore, user 112 uses a user device 504 to access those systems through cloud 502.

FIG. 5 also depicts another example of a cloud architecture. FIG. 5 shows that it is also contemplated that some elements of computing system 102 are disposed in cloud 502 while others are not. By way of example, data store 124 can be disposed outside of cloud 502, and accessed through cloud 502. In another example, data aggregated and view generator 118 can also be outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
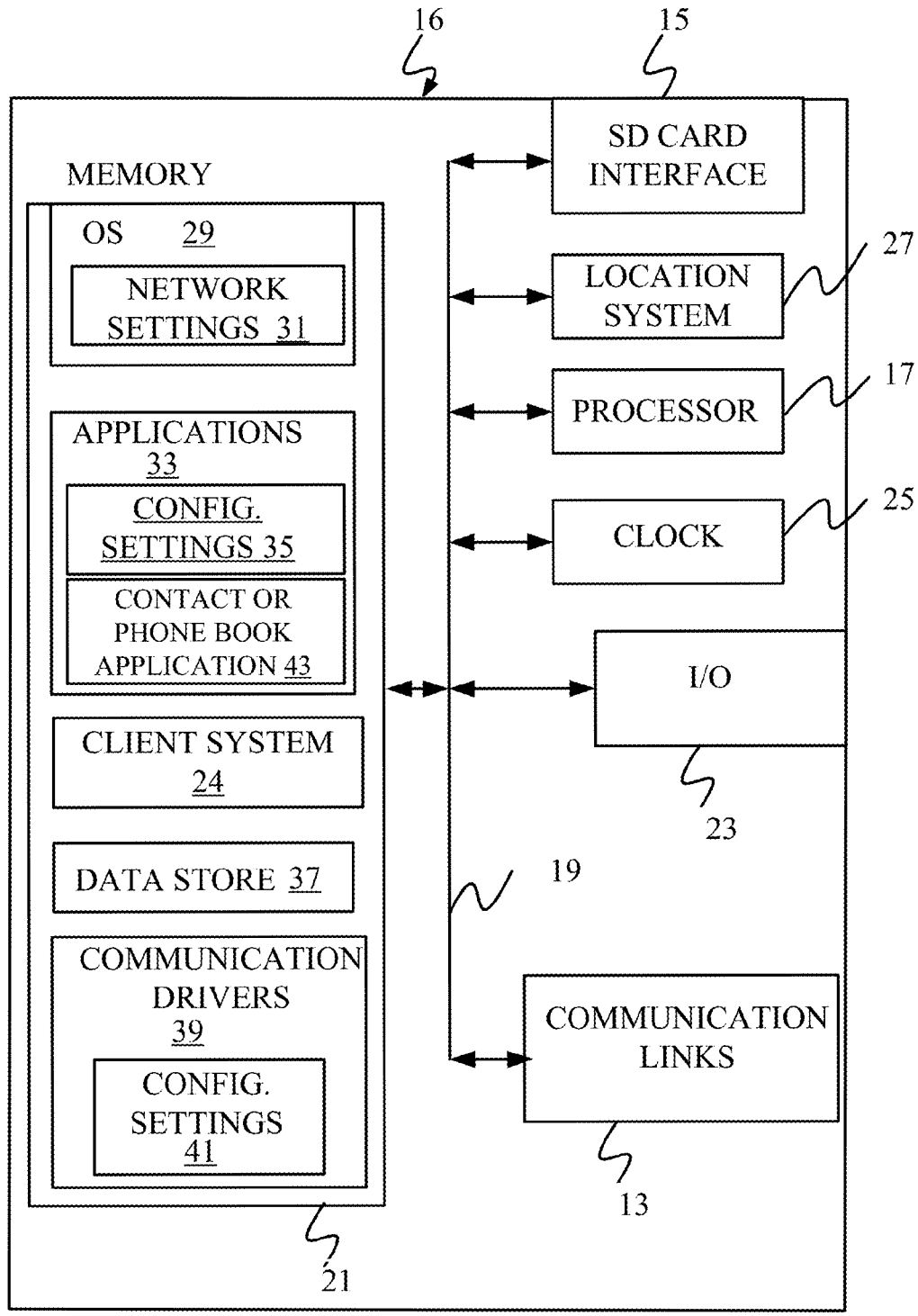
FIGS. 6-8 show various examples of mobile devices that can be used in the architectures mentioned above.
Figure 7:
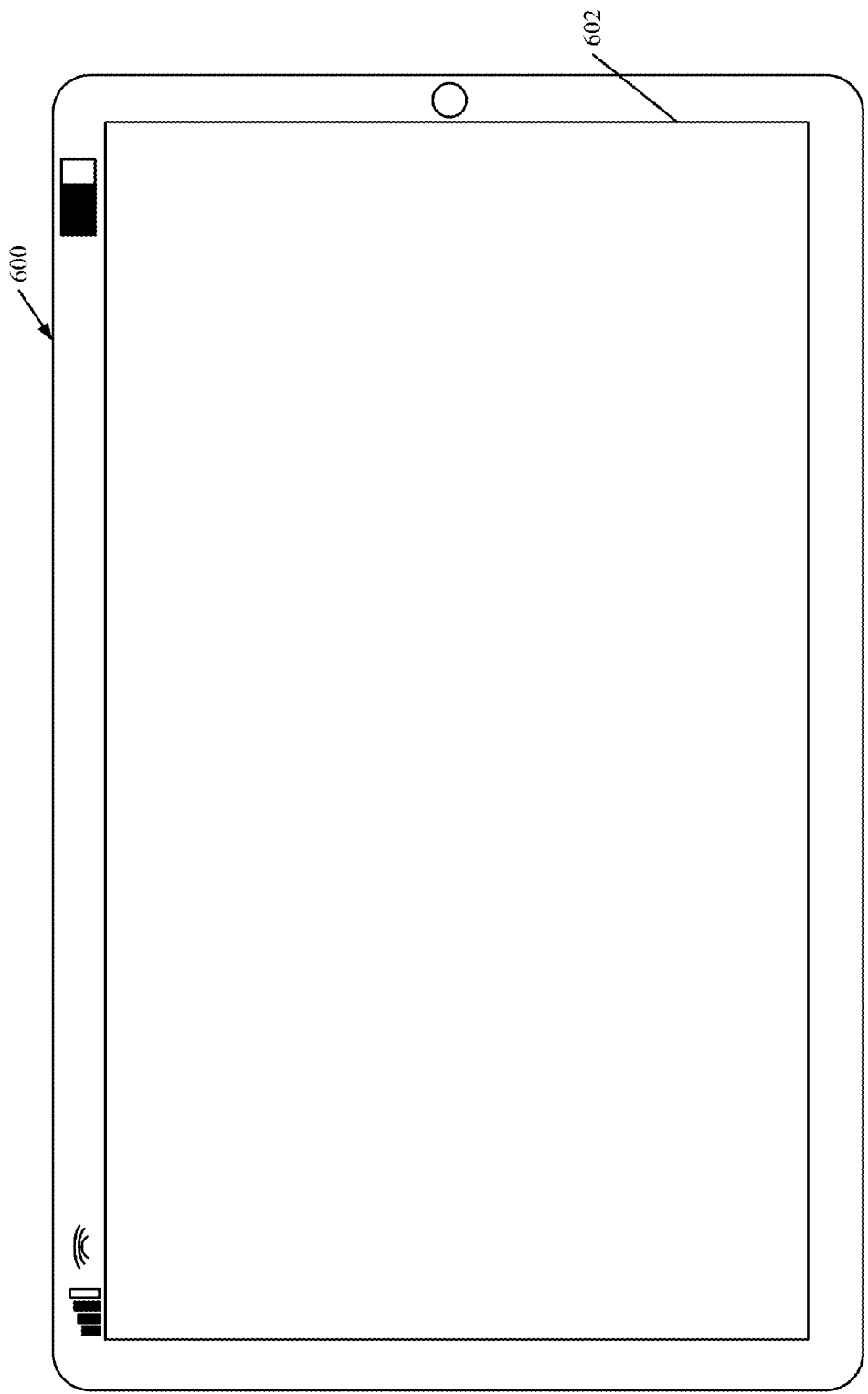
Figure 8:
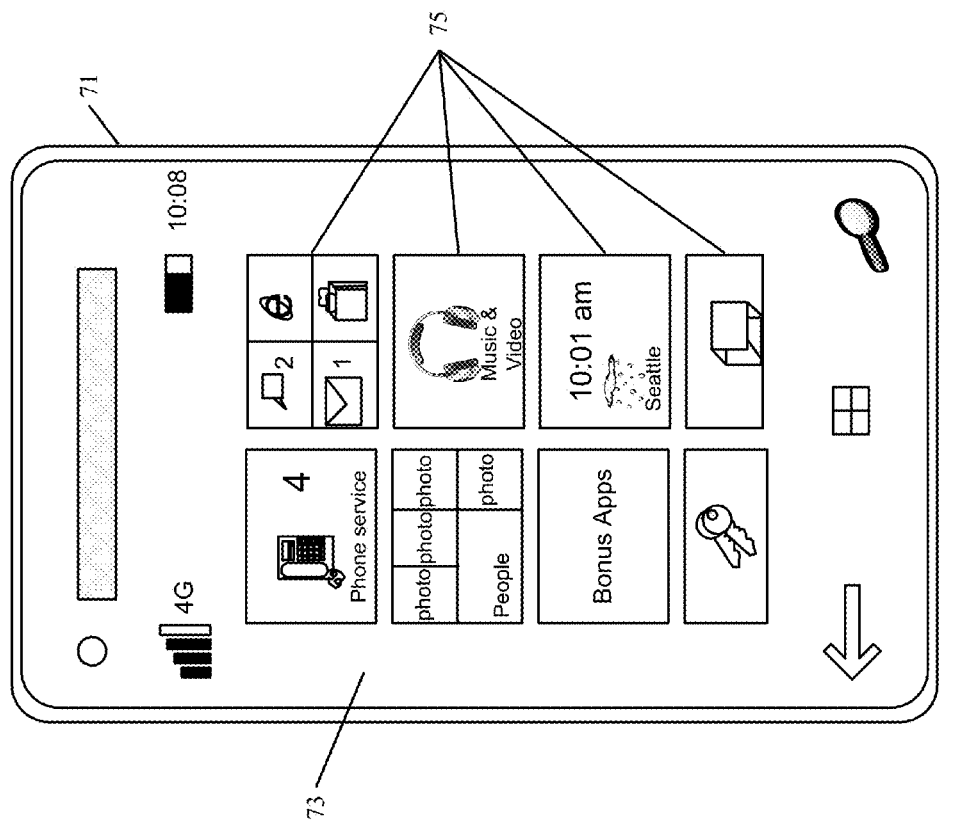

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of computing system 102 or that interacts with system 102, or both. In the device 16, a communications link 13 is provided that allows the handheld device to communicate with other computing devices and under some embodiments provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

Under other examples, applications or systems are received on a removable Secure Digital (SD) card that is connected to a SD card interface 15. SD card interface 15 and communication links 13 communicate with a processor 17 (which can also embody processors or servers 110 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various business applications or embody parts or all of system 102. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can also be used. Device 16 can be a feature phone, smart phone or mobile phone. The phone can include a set of keypads for dialing phone numbers, a display capable of displaying images including application images, icons, web pages, photographs, and video, and control buttons for selecting items shown on the display. The phone can include an antenna for receiving cellular phone signals such as General Packet Radio Service (GPRS) and 1xrtt, and Short Message Service (SMS) signals. In some examples, the phone also includes a Secure Digital (SD) card slot that accepts a SD card.

The mobile device can also be a personal digital assistant (PDA) or a multimedia player or a tablet computing device, etc. (hereinafter referred to as the PDA). The PDA can include an inductive screen that senses the position of a stylus (or other pointers, such as a user's finger) when the stylus is positioned over the screen. This allows the user to select, highlight, and move items on the screen as well as draw and write. The PDA can also include a number of user input keys or buttons which allow the user to scroll through menu options or other display options which are displayed on the display, and allow the user to change applications or select user input functions, without contacting the display. Although not shown, the PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections.

FIG. 8 shows that the phone can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
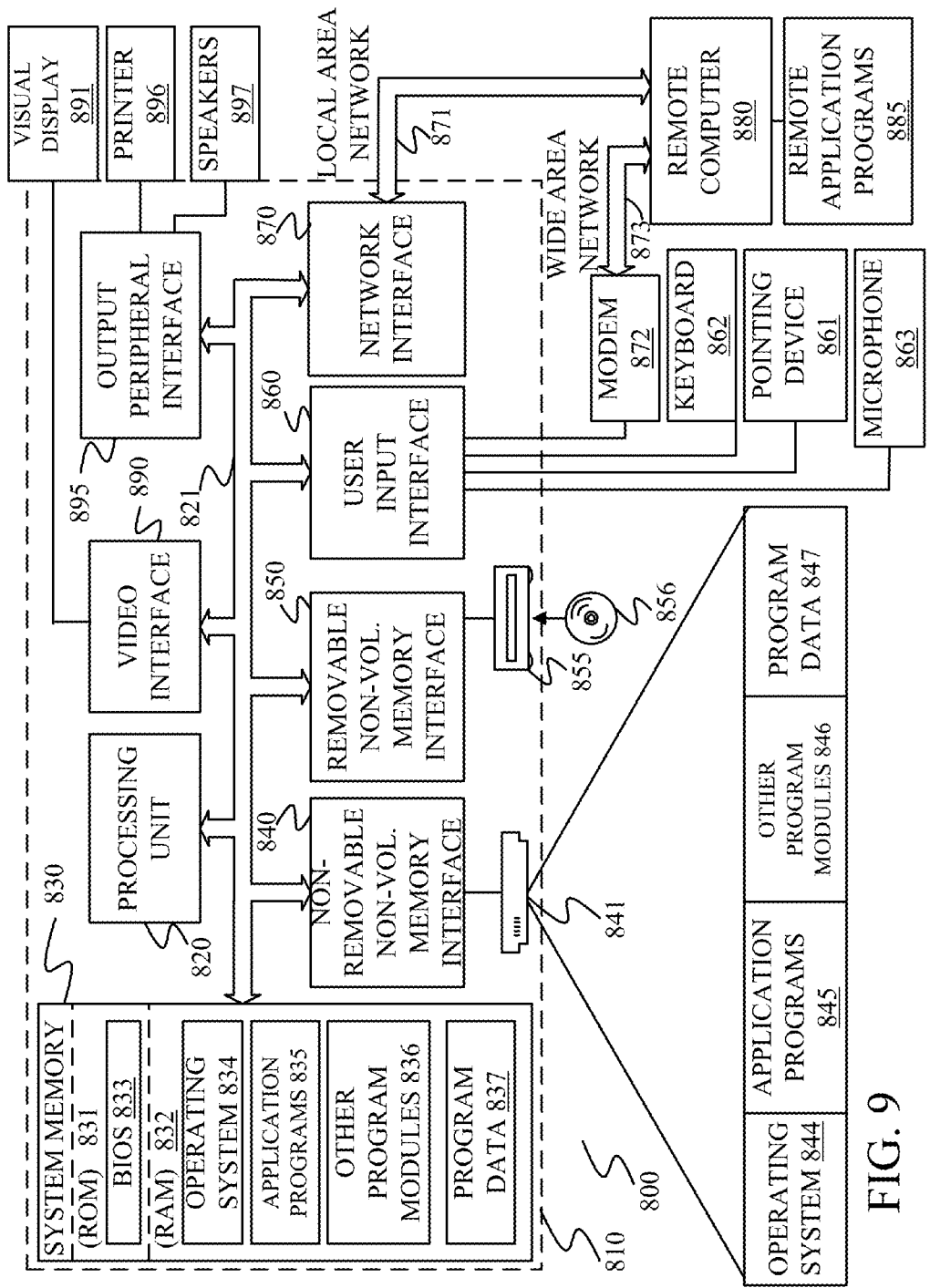
FIG. 9 is a block diagram of one example of a computing environment.

FIG. 9 is one embodiment of a computing environment in which architecture 100, or parts of it, (for example) can be deployed. With reference to FIG. 9, an exemplary system for implementing some embodiments includes a general-purpose computing device in the form of a computer 810. Components of computer 810 may include, but are not limited to, a processing unit 820 (which can comprise processor or servers 110), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a display system that displays a document selection user interface display with a document selection user input mechanism;

an aggregate view generator, coupled to the display system, that detects a user document selection interaction, with the document selection user input mechanism, selecting a document and, in response accesses relationship information in tables defining each document in the set of documents to be displayed and the selected document, to identify a set of related documents, related to the selected document, to be displayed, the aggregate view generator identifying summary information corresponding to each of the selected document and the set of related documents to be displayed; and a data extraction component, coupled to the aggregate view generator, that extracts summary information, corresponding to each document in the set of related documents to be displayed and the selected document, from the tables defining each document in the set of related documents to be displayed and the selected document, the aggregate view generator controlling the display system by generating an aggregate view on a single user interface display, the aggregate view including a separate, user selectable, document display pane corresponding to each type of document in the set of related documents to be displayed and the selected document, the aggregate view displaying, on each document display pane, the corresponding summary information, corresponding to each of the documents in the set of related documents to be displayed and the selected document.

Example 2 is the computing system of any or all previous examples and further comprising:

a detailed view generator that detects a user pane selection interaction selecting a document display pane, corresponding to a given document, on the aggregate view and identifying a first level of detail information corresponding to the given document, the data extraction component extracting a first level of detail information from the tables defining the given document, and the aggregate view generator controlling the display system to display the first level of detail information on the selected document display pane on the aggregate view.

Example 3 is the computing system of any or all previous examples wherein the detailed view generator further detects a user detail interaction, interacting with a displayed data item of the first level of detail information, the data extraction component extracting a second level of detail information corresponding to the displayed data item, from the tables defining the given document, and the aggregate view generator controlling the display system to display the second level of detail information on the aggregate view.

Example 4 is the computing system of any or all previous examples wherein the detailed view generator detects the user detail interaction by detecting a hover interaction indicative of a user hovering a cursor over the displayed data item, and wherein the aggregate view generator controls the display system to display the second level of detail information by displaying the second level of detail information in a popup display on the aggregate view.

Example 5 is the computing system of any or all previous examples wherein the aggregate view generator controls the display system to generate the aggregate view with a view switching user input mechanism, and further comprising:

a view switching component that detects user interaction with the view switching user input mechanism and, in response, identifies related, disparate information, that is related to corresponding documents of the selected document and the set of related documents to be displayed, the aggregate view generator controlling the display system to display the related, disparate information on the document display panes corresponding to the documents to which the related, disparate information is related.

Example 6 is the computing system of any or all previous examples and further comprising:

a transactional computing system that generates documents, wherein the user document selection interaction selects the selected document in the transactional computing system that generates documents; and a data tracking system, different from the transactional computing system, that generates the disparate information.

Example 7 is the computing system of any or all previous examples and further comprising:

a configuration system that generates a configuration user interface display with configuration user input mechanisms that detect user mapping inputs, the configuration system generating mappings, based on the user mapping inputs, mapping documents to other information, the aggregate view generator accessing the mappings to generate the aggregate view.

Example 8 is the computing system of any or all previous examples wherein the configuration system comprises:

a document relationship configuration component that generates the configuration user interface display with document relationship user input mechanisms and detects user interaction with the document relationship user input mechanisms to generate a document-to-document mapping that maps a given document to a set of related document types, the aggregate view generator identifying the set of related documents to be displayed for the given document as related documents of a type in the set of related document types mapped to the given document.

Example 9 is the computing system of any or all previous examples wherein the configuration system comprises:

a data extraction configuration component that generates the configuration user interface display with summary user input mechanisms and detail user input mechanisms and detects user interaction with the summary user input mechanisms and detail user input mechanisms to generate a document-to-summary mapping and a document-to-detail mapping, respectively, the document-to-detail mapping including information that maps a given document to corresponding summary information and the document-to-detail mapping including information that maps the given document to corresponding first and second level detail information, the detailed view generator accessing the document-to-summary mapping and the document-to-detail mapping to identify the summary information and the first and second level detail information for the given document.

Example 10 is a computer implemented method, comprising:

displaying a document selection user interface display with a document selection user input mechanism;

detecting a user document selection interaction, with the document selection user input mechanism, selecting a document;

in response to detecting the user document selection interaction:

accessing relationship information in tables defining each document in the set of documents to be displayed and the selected document, to identify a set of related documents, related to the selected document, to be displayed;

extracting summary information, corresponding to each document in the set of related documents to be displayed and the selected document, from the tables defining each document in the set of related documents to be displayed and the selected document; and controlling a display system by generating an aggregate view on a single user interface display, the aggregate view including a separate, user selectable, document display pane for each document in the set of related documents to be displayed and the selected document, the aggregate view displaying, on each document display pane, the corresponding summary information, corresponding to each of the documents in the set of related documents to be displayed and the selected document.

Example 11 is the computer implemented method of any or all previous examples and further comprising:

detecting a user pane selection interaction selecting a document display pane on the aggregate view;

extracting a first level of detail information from the tables defining the document corresponding to the selected document display pane; and displaying the first level of detail information on the selected document display pane on the aggregate view.

Example 12 is the computer implemented method of any or all previous examples and further comprising:

detecting a user detail interaction, interacting with a displayed data item of the first level of detail information;

extracting a second level of detail information corresponding to the displayed data item, from the tables defining the document corresponding to the selected document display pane; and displaying the second level of detail information on the aggregate view.

Example 13 is the computer implemented method of any or all previous examples wherein detecting a user detail interaction comprises:

detecting a hover interaction indicative of a user hovering a cursor over the displayed data item, and wherein displaying the second level of detail information comprises displaying the second level of detail information in a popup display on the aggregate view.

Example 14 is the computer implemented method of any or all previous examples and further comprising:

detecting a user detail interaction, interacting with a displayed data item on the aggregate view;

extracting a second level of detail information corresponding to the displayed data item, from the tables defining the displayed data item; and displaying the second level of detail information on the aggregate view.

Example 15 is the computer implemented method of any or all previous examples wherein controlling the display system comprises:

generating the aggregate view with a view switching user input mechanism;

detecting user interaction with the view switching user input mechanism;

identifying related, disparate information, that is related to corresponding documents of the selected document and the set of related documents to be displayed; and displaying the related, disparate information on the document display panes corresponding to the documents to which the related, disparate information is related.

Example 16 is the computer implemented method of any or all previous examples wherein the user document selection interaction selects the selected document in a transactional system that generates documents and wherein identifying related, disparate information comprises:

identifying information that is generated by a disparate data system, different from the transactional system that generates the documents.

Example 17 is the computer implemented method of any or all previous examples wherein identifying the set of related documents for a given document comprises:

identifying a first set of related documents, directly related to the given document by the relationship information in a table defining the given document; and identifying additional related documents, indirectly related to the given document, as documents related to the first set of related documents through a chain of relationship information in tables defining the first set of related documents and additional related documents.

Example 18 is a computing system, comprising:

a first data processing system that generates transactional documents;

a second data processing system that generates disparate information, that is separate from the transactional documents;

a display system; and a data aggregation system that detects a user interaction selecting a transactional document and identifies related transactional documents in the first data processing system that are related to the selected transactional document, the data aggregation system controlling the display system to display an aggregate view that includes, on a single user interface display, a separate user-selectable document display pane corresponding to each of the selected transactional document and the related transactional documents, the data aggregation system detecting user interactions requesting detailed information and controlling the display system to display each given document display pane on the aggregate view with varying levels of detailed information, from the corresponding transactional document and related disparate information, based on the detected user interactions.

Example 19 is the computing system of any or all previous examples and further comprising:

a configuration system that generates a configuration user interface display with configuration user input mechanisms that detect user mapping inputs, the configuration system generating mappings, based on the user mapping inputs, mapping documents to other information, the data aggregation system accessing the mappings to generate the aggregate view.

Example 20 is the computing system of any or all previous examples wherein the data aggregation system controls the display system to generate the aggregate view with a view switching user input mechanism, and further comprising:

a view switching component that detects user interaction with the view switching user input mechanism and, in response, identifies the related disparate information, that is related to corresponding documents of the selected transactional document and the related transactional documents, the data aggregation system controlling the display system to display the related disparate information on the document display panes corresponding to the documents to which the related, disparate information is related.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
a processor; and
memory storing instructions executable by the processor, wherein the instructions, when executed, configure the computing system to:
based on an indication of a document selection input, select a document;
identify a set of related documents, that are related to the selected document, based on relationship information in data records representing the set of related documents and the selected document;
based on the data records,
extract summary information corresponding to each related document in the set of related documents, and
identify a plurality of different document types in the set of related documents;
generate a representation of an aggregate view on a single user interface display, wherein the aggregate view includes a plurality of separate, user selectable, document display panes representing the plurality of different document types,
each document display pane corresponding to a particular one of the document types and representing the summary information corresponding to the related documents, in the set of related documents, of the particular related document type; and
in response to an indication of a pane selection user input,
select one of the document display panes, corresponding to a particular one of the related documents, on the aggregate view,
extract detail information corresponding to the particular related document, the detail information comprising information in addition to the summary information corresponding to the particular related document, and
modify the selected document display pane on the aggregate view to include the detail information.

2. The computing system of claim 1 wherein each document type is related to a different type of transactional task.

3. The computing system of claim 1 wherein the extracted detail information comprises a first level of detail information, and the instructions configure the computing system to:
receive an indication of a user detail interaction associated with a particular data item of the first level of detail information;
extract a second level of detail information corresponding to the particular data item, from the data record representing the particular document; and
modify the aggregate view to include the second level of detail information.

4. The computing system of claim 3 wherein the instructions configure the computing system to:
receive an indication of a hover interaction indicative of a user hovering a cursor over the particular data item; and
modify the aggregate view to include the second level of detail information in a popup display.

5. The computing system of claim 3 wherein the instructions configure the computing system to:
generate the aggregate view with a view switching user input mechanism; based on an indication of user actuation of the view switching user input mechanism,
identify related information, that is related to a corresponding document; and modify the plurality of display panes to include the related information.

6. The computing system of claim 1 wherein the data records comprise tables, and the instructions, when executed, configure the computing system to:
generate a representation of a document selection user interface display with a document selection user input mechanism, wherein the indication of the document selection input is indicative of user actuation of the document selection user input mechanism.

7. The computing system of claim 6 wherein the instructions, when executed, configure the computing system to:
generate a representation of a configuration user interface display with a configuration user input mechanism;
based on an indication of user actuation of the configuration user input mechanism, generate a mapping that maps a document to other information; and
access the mapping to generate the aggregate view.

8. The computing system of claim 7 wherein the instructions configure the computing system to:
generate the representation of the configuration user interface display with a document relationship user input mechanism;
based on an indication of user actuation of the document relationship user input mechanism, generate a document-to-document mapping that maps a given document to a set of related document type; and
identify the set of related documents as related documents of a type in the set of related document types.

9. The computing system of claim 7 wherein the instructions configure the computing system to:
generate the representation of the configuration user interface display with a summary user input mechanism and a detail user input mechanism;
based on an indication of user actuation of the summary user input mechanism, generate a document-to-summary mapping that includes information that maps a given document to corresponding summary information;
based on an indication of user actuation of the detail user input mechanism, generate a document-to-detail mapping that includes information that maps the given document to corresponding first and second level detail information,
access the document-to-summary mapping to identify the summary information; and
access the document-to-detail mapping to identify the first and second level detail information for the given document.

10. A computer implemented method, comprising:
based on an indication of a document selection user input, selecting a document;
identifying a set of related documents, that are related to the selected document, based on relationship information in data records representing the set of documents and the selected document;
extracting summary information corresponding to each related document in the set of related documents;
identifying a plurality of different document types in the set of related documents; and
generating a representation of an aggregate view on a single user interface display, wherein the aggregate view includes a plurality of separate, user selectable, document display panes representing the plurality of different document types,
each document display pane corresponding to a particular one of the document types and representing the summary information corresponding to the documents, in the set of related documents, of the particular document type;
in response to an indication of a pane selection user input, selecting a particular one of the document display panes, corresponding to a particular one of the related documents, on the aggregate view,
extracting a first level of detail information that corresponds to the particular related document and includes information in addition to the summary information corresponding to the particular related document, and
modifying the particular document display pane on the aggregate view to include the first level of detail information;
based on an indication of a user detail selection input, selecting a particular data item of the first level of detail information in the particular document display pane;
extracting a second level of detail information corresponding to the particular data item, from the data record defining the related document corresponding to the selected document display pane; and
generating a representation of the second level of detail information on the aggregate view.

11. The computer implemented method of claim 10 wherein each document type is related to a different type of transactional task.

12. The computer implemented method of claim 10 wherein receiving an indication of a user detail interaction comprises:
receiving an indication of a hover interaction indicative of a user hovering a cursor over the particular data item, and wherein generating the representation of the second level of detail information comprises generating the representation of the second level of detail information in a popup display on the aggregate view.

13. The computer implemented method of claim 11 and further comprising:
receiving an indication of a user detail interaction, associated with a particular data item on the aggregate view;
extracting a second level of detail information corresponding to the particular data item, from the data record defining the particular data item; and
generating a representation of the second level of detail information on the aggregate view.

14. The computer implemented method of claim 10 and further comprising: generating the representation of the aggregate view with a view switching user input mechanism; based on an indication of user actuation of the view switching user input mechanism, identifying related information, that is related to a corresponding related document; and generating a representation of the related information on the document display pane corresponding to the corresponding related documents.

15. The computer implemented method of claim 10 wherein the data records comprise tables, and further comprising:
generating a representation of a document selection user interface display with a document selection user input mechanism.

16. The computer implemented method of claim 15 and further comprising:
identifying a first set of related documents, directly related to a given document by the relationship information in a table defining the given document; and identifying additional related documents, indirectly related to the given document, as documents related to the first set of related documents through a chain of relationship information in tables defining the first set of related documents and additional related documents.

17. A computing system, comprising:

a processor; and memory storing instructions executable by the processor, wherein the instructions, when executed, configure the computing system to provide:
- a first data processing system configured to generate transactional documents;
- a second data processing system configured to generate summary information, that corresponds to each transactional document and is separate from the transactional document; and
- a data aggregation system configured to:
  - based on an indication of a user interaction, select a transactional document;
  - identify related transactional documents in the first data processing system that are related to the selected transactional document;
  - obtain the summary information corresponding to each related transactional document;
  - identify a plurality of different document types in the related transactional documents, wherein each document type is related to a different type of transactional task;
  - generate a representation of an aggregate view that includes, on a single user interface display:
    - a selected document display pane corresponding to the selected transactional document;
    - a plurality of separate, user-selectable, document display panes representing the plurality of different document types,
      - each document display pane corresponding to a particular one of the document types and representing the summary information corresponding to the related documents, in the set of related documents, of the particular related document type; and
  - in response to an indication of a pane selection user input,
    - select one of the document display panes, corresponding to a particular one of the related documents, on the aggregate view,
    - extract detail information corresponding to the particular related document, the detail information comprising information in addition to the summary information corresponding to the particular related document, and
    - modify the selected document display pane on the aggregate view to include the detail information.

18. The computing system of claim 17 wherein the instructions, when executed, configure the computing system to provide:
a configuration system configured to:
  generate a configuration user interface display with configuration user input mechanisms configured to detect a user mapping; and
  generate, based on the user mapping input, mapping information that maps documents to other information,
wherein the data aggregation system is configured to access the mapping information to generate the aggregate view.

19. The computing system of claim 17 wherein the data aggregation system is configured to generate the aggregate view with a view switching user input mechanism, and wherein the instructions, when executed, configure the computing system to provide:
a view switching component configured to detect user interaction with the view switching user input mechanism and, in response, identify the related disparate information, that is related to corresponding documents of the selected transactional document and the related transactional documents,
wherein the data aggregation system is configured to display the related disparate information on the document display panes corresponding to the documents to which the related, disparate information is related.

* * * * *